US007733327B2

(12) United States Patent
Harley et al.

(10) Patent No.: US 7,733,327 B2
(45) Date of Patent: Jun. 8, 2010

(54) RE-CENTERING MECHANISM FOR AN INPUT DEVICE

(75) Inventors: Jonah A. Harley, Mountain View, CA (US); Robert E. Wilson, Palo Alto, CA (US); Arthur Stanley Brigham, Sunnyvale, CA (US); Joel F. Jensen, Redwood City, CA (US); Sung Hoon Kim, Palo Alto, CA (US)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 1018 days.

(21) Appl. No.: 11/407,274

(22) Filed: Apr. 19, 2006

(65) Prior Publication Data

US 2007/0247423 A1 Oct. 25, 2007

(51) Int. Cl.
*G09G 5/08* (2006.01)
(52) U.S. Cl. .................... 345/157; 345/156; 345/173
(58) Field of Classification Search ............... 345/156, 345/157, 173, 184; 200/5, 6 A; 341/20, 341/21, 22
See application file for complete search history.

(56) References Cited

U.S. PATENT DOCUMENTS

| 5,327,162 | A   | 7/1994  | Soma         |         |
|-----------|-----|---------|--------------|---------|
| 6,266,046 | B1  | 7/2001  | Arita        |         |
| 6,611,139 | B1  | 8/2003  | Jackson      |         |
| 6,667,733 | B2  | 12/2003 | Miyoshi      |         |
| 6,760,006 | B2  | 7/2004  | Arita et al. |         |
| 6,831,238 | B1  | 12/2004 | Lau          |         |
| 6,952,197 | B1* | 10/2005 | Nakamura et al. | 345/157 |
| 7,439,461 | B2* | 10/2008 | Sawada et al. | 200/6 A |
| 2002/0033798 | A1* | 3/2002 | Nakamura et al. | 345/156 |
| 2005/0024327 | A1 | 2/2005 | Hagiwara et al. | |
| 2005/0057523 | A1 | 3/2005 | Moyer | |
| 2005/0110747 | A1 | 5/2005 | Harley et al. | |
| 2005/0110755 | A1 | 5/2005 | Harley et al. | |
| 2006/0158429 | A1* | 7/2006 | Harley et al. | 345/157 |
| 2006/0181517 | A1* | 8/2006 | Zadesky et al. | 345/173 |

FOREIGN PATENT DOCUMENTS

| EP | 0810544 | 3/1997 |
| GB | 2247938 | 3/1992 |
| JP | 6-325662 | 11/1994 |
| JP | 8-022745 | 1/1996 |
| JP | 10055250 A | 2/1998 |
| JP | 11-134108 | 5/1999 |
| JP | 2002-091691 | 3/2002 |
| JP | 2002-140960 | 5/2002 |
| JP | 2002-157076 | 5/2002 |
| JP | 2002-190235 | 7/2002 |
| JP | 2002-260489 | 9/2002 |
| JP | 2003-050666 | 2/2003 |
| JP | 2003-345509 | 12/2003 |
| JP | 2005-228593 | 8/2005 |
| WO | WO-00/51358 | 8/2000 |

* cited by examiner

*Primary Examiner*—Amare Mengistu
*Assistant Examiner*—Premal Patel

(57) ABSTRACT

An input device includes a positioning element and a spring member. The positioning element comprises a generally disc shaped member. The spring member is a generally annular shaped spring member that is generally planar and that defines a generally serpentine pattern. The spring member is positioned laterally outward relative to the positioning element and is configured to exert a biasing force radially inwardly toward the positioning element.

23 Claims, 13 Drawing Sheets

RE-CENTERING MECHANISM FOR AN INPUT DEVICE

BACKGROUND

The optical mouse has been overwhelmingly popular for controlling functions of computers and other electronic devices. However, the conventional optical mouse is too big and unsuitable for use in many portable electronic devices such as personal digital assistants, telephones, etc. Accordingly, other types of conventional input devices, such as TouchPad™ devices and puck-based input devices, have been developed and embedded into portable electronic devices, such as laptop computers, phones, etc. These input devices have become more important as portable electronic devices continue to incorporate more functionality, such as electronic mail, wireless computing, photography, etc.

Conventional puck-based input devices are attractive for handheld electronic devices because of their low profile. In some conventional puck-based input devices, a resilient mechanism, such as a spring, is deployed in association with the puck to maintain a desired position of the puck. The resilient mechanism is arranged to bias the puck to return to a center position after the puck has been moved to an off-center position, in which the user captures a user input. Unfortunately, the resilient mechanisms in conventional puck-based input devices either typically provide inaccurate and sloppy re-centering of the puck, or do not have a small enough form factor for many portable electronic applications.

In rate control devices such as the IBM TrackPoint™ the position of the puck maps to the velocity of the cursor. For rate control devices, accurate recentering is important because if the puck is not returned precisely to center, the cursor may drift when the user is not touching it. To work around this problem, these conventional input devices typically employ a sufficiently large central "dead zone," or use a very stiff restoring spring, both of which are detrimental to a good user experience. The Neuropointer™ by NEC is an example of a conventional portable puck-based navigation device which uses a rubber membrane to re-center the puck. Because the membrane is essentially a linear spring, the recentering accuracy is relatively poor.

Other conventional input devices attempt to address the accuracy of re-centering a puck with re-centering mechanisms having alternative force restoring force profiles. Unfortunately, these conventional input devices are too thick to fit in many portable electronic devices.

Users continue to demand more precision and accuracy in user input devices of portable electronic devices, while designers face continual pressure toward increasing miniaturization and increased functionality. With these challenges, conventional input devices fall short of market expectations by exhibiting inaccurate puck centering and positioning.

SUMMARY

Embodiments of the invention are directed to an input device for capturing user control inputs of an electronic device. In one embodiment, the input device comprises a positioning element and a spring member. The positioning element comprises a generally disc shaped member. The spring member is a generally annular shaped and generally planar spring member that defines a generally serpentine pattern. The spring member is positioned laterally outward relative to the positioning element and is configured to exert a biasing force radially inwardly toward the positioning element.

DETAILED DESCRIPTION

Figure 1:
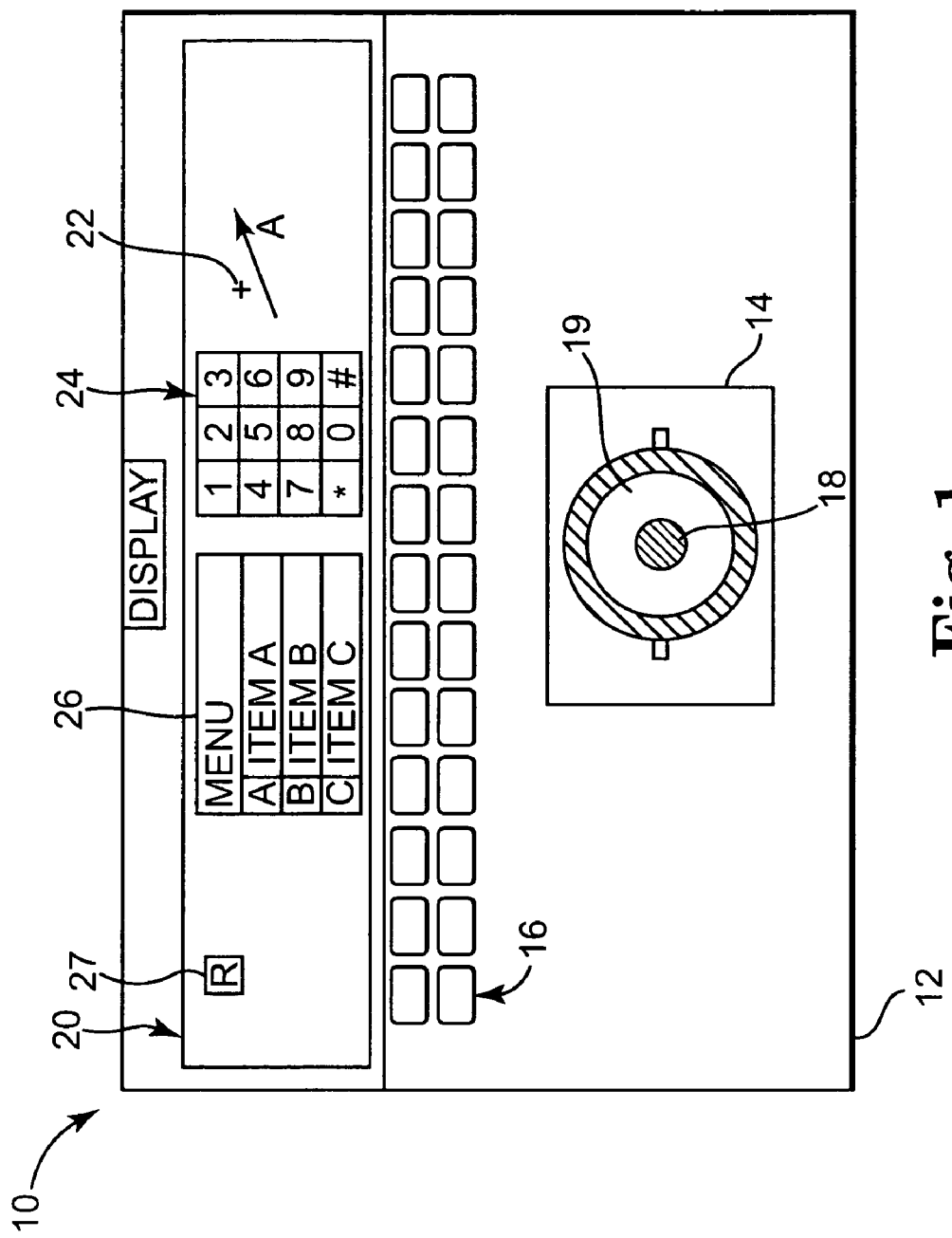
FIG. 1 is a top plan view of an electronic device including an input device, according to an embodiment of the invention.

In the following Detailed Description, reference is made to the accompanying drawings, which form a part hereof, and in which is illustrated by way of illustration specific embodiments in which the invention may be practiced. In this regard, directional terminology, such as "top," "bottom," "front," "back," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following Detailed Description, therefore, is not to be taken in a limiting sense, and the scope of the present invention is defined by the appended claims.

Embodiments of the invention are directed to a user input device. In one embodiment, an input device includes a positioning element and a re-centering mechanism configured to improve accuracy of center positioning of the positioning element. In one aspect, the re-centering mechanism applies a minimum biasing force to overcome frictional forces that otherwise impede accurate re-centering of the positioning element. In one aspect, a re-centering mechanism applies a biasing force substantially continuously, upon slidable movement of the positioning element relative to the re-centering mechanism, to accurately center the positioning element despite the frictional forces acting on the positioning element adjacent a zero-input position or a center position of the positioning element. Accordingly, when application of a force from a user's finger (i.e., finger-applied force) exceeds the biasing force of the re-centering mechanism, the positioning element is moved to an off-center position to capture a user control input. Upon release of the finger-applied force, the biasing force causes the positioning element to be accurately returned to the zero-input position (or a center position) because the biasing force has minimum amplitude that exceeds any frictional forces that would otherwise prevent accurate re-centering centering of the positioning element.

In one embodiment, a finger force is applied on the positioning element to slidably move the positioning element and the re-centering mechanism acts directly on the positioning element to re-center the positioning element. Accordingly, in this embodiment, the positioning element directly receives application of a finger-applied force by a user.

In another embodiment, a puck (e.g., a slidable disc) directly receives application of finger force by a user and is arranged for slidable movement on a surface of a housing. A positioning element and a re-centering mechanism are contained within the housing. The puck is connected to the positioning element and the re-centering mechanism acts directly on the positioning element (and only indirectly on the puck) to re-center both the puck and the positioning element. Accordingly, in this embodiment, there is a direct one-to-one correspondence between the position and movement of the puck relative to the position and movement of the positioning element. This arrangement enables a re-centering mechanism and linkages (for connecting the puck and the positioning element, as well as other components) to be hidden within a housing, resulting in the simple appearance of only the puck or disc slidably moving on an exterior surface of the housing.

In addition to providing accurate re-centering of a puck or positioning element of an input device, embodiments of the invention also achieve an input device having a low profile relative to the portable electronic device into which the input device is incorporated. By achieving this low profile or small form factor for the input device, the slim design of portable electronic devices can be maintained while achieving greater functionality and accuracy.

Accordingly, in one embodiment, a re-centering mechanism comprises a spring member that is generally annularly shaped. In one aspect, the spring member is sized and shaped to surround the positioning element and to extend in generally the same plane as the positioning element. The spring member is positioned laterally outward relative to the positioning element and is configured to exert a biasing force radially inwardly against the positioning element. Accordingly, by positioning the spring member to extend in generally the same plane as the positioning element, a low profile re-centering mechanism is achieved.

In one embodiment, the spring member is a generally planar element to enable the re-centering mechanism, and therefore the input device, to have a low profile or small form factor. In one aspect, the spring member defines a generally planar element (extending through a single, generally horizontal plane) by having a thickness generally corresponding to (or less than) a thickness of the positioning element so that with the spring member positioned to extend in generally the same plane as the positioning element, the spring member does not significantly extend vertically below or above the plane through which the positioning element extends.

In another embodiment, in addition to be generally planar, the spring member is a generally flat, sheet-like member formed via stamping as a single, unitary element to further reduce the thickness or profile of the re-centering mechanism.

Accordingly, embodiments of the invention are in contrast to a coil spring of a conventional re-centering mechanism in which the coil spring has a significant vertical dimension in the input device.

In addition, in one embodiment the input device includes a stop mechanism interposed between an outer portion of the spring member and the positioning element to control the biasing force exerted by the spring member against the positioning element. In one aspect, the stop mechanism extends in generally the same plane as the positioning element and the spring member and is positioned generally laterally outward relative to the positioning element. This arrangement also produces a low profile re-centering mechanism, as the stop mechanism is effectively placed alongside the positioning element rather than over or on top of the positioning element, as occurs in some conventional input devices.

Accordingly, various aspects of embodiments of the invention enable a re-centering mechanism of an input device to achieve a small form factor or low profile. These embodiments and other embodiments of the invention are described and illustrated in association with FIGS. 1-14C.

An input device, according to one embodiment of the invention, is implemented as a stand-alone pointing device that replaces a conventional mouse. Embodiments of the invention are also particularly well suited for implementation on a laptop computer or other host apparatus having limited space for an input device. FIG. 1 is a diagram illustrating a top view of a portable electronic device 10 including an input device 14, according to one embodiment of the present invention. In one embodiment, portable electronic device 10 is a laptop computer. In other embodiments, device 10 is any type of portable electronic device including an input device 14 for capturing user control inputs, including but not limited to a cellular/wireless telephone, personal digital assistant (PDA), digital camera, portable game device, pager, portable music player, and handheld computer.

As illustrated in FIG. 1, device 10 comprises housing 12 which carries input device 14, keyboard 16, and display 20. Display 20 comprises a screen and cursor 22. Display 20 further comprises one or more elements of a graphical user interface (GUI) including, but not limited to keypad 24, menu 26, and icon 27. Keypad 24 comprises one or more activatable keys representing numbers, letters, or other symbols. In other embodiments, cursor 22 comprises different shaped objects such as pointers, cartoon-type characters, etc. Input device 14 comprises a puck 18 (or positioning element) slidably movable within a puck field of motion 19 for capturing user control inputs associated with electronic device 10, such as selecting and activating functions associated with display 20. In one aspect, input device 14 comprises a re-centering mechanism for controlling accurate re-centering of puck 18 after movement of puck 18 to an off-center position to capture a user input. This re-centering mechanism, according to embodiments of the invention, is described and illustrated in greater detail in association with FIGS. 2-14C.

Figure 2:
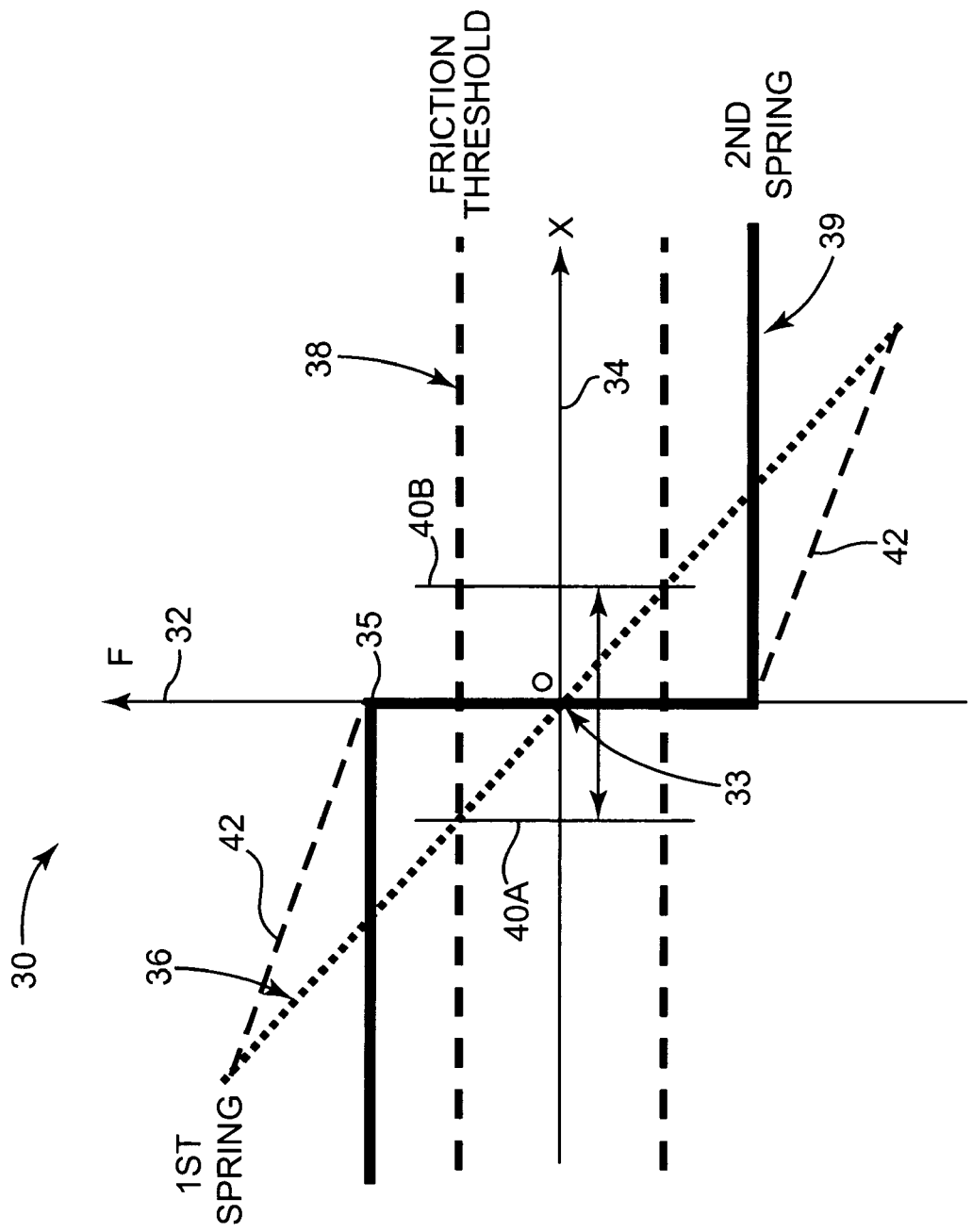
FIG. 2 is a graph illustrating a force curve for a re-centering mechanism of an input device, according to an embodiment of the invention.

FIG. 2 is a diagram illustrating an ideal force curve for a re-centering mechanism of an input device, according to one embodiment of the invention. As illustrated in FIG. 2, diagram 30 comprises a y-axis 32 and an x-axis 34. The x-axis 34 represents a position of a positioning element laterally outward relative to a zero-input position 33 while the y-axis 32 represents the lateral or radial force exerted upon the positioning element by various components of the input device. In one aspect, the x-axis 34 represents a position of a puck linked to a positioning element. In another aspect, the zero-input position 33 generally corresponds to a center position of the puck within a puck field of motion. In other aspects, the zero-input position 33 generally corresponds to a position of the puck that is not a center position within a puck field of motion.

In one embodiment, graph 30 comprises a first spring curve 36, a friction threshold 38, a second spring curve 39 and a friction range 40A, 40B. The first spring curve 36 represents a force curve for a conventional re-centering mechanism employing a generally linear spring element(s). The curve 36 represents the biasing force of the spring element that is zero at a zero-input position of the puck, and that increases in a generally linear manner as the positioning element is moved away from the center or zero-input position. However, a friction range 40A, 40B represents a positional area in which the positioning element is adjacent the zero-input position 33 and the frictional force between the positioning element and its supporting surface(s) (among other frictional forces) exceeds the biasing force of the conventional re-centering mechanism. These frictional forces are represented in graph 30 of FIG. 2 by friction threshold 38.

In one aspect, the frictional forces in graph 30 represent friction between a puck and a contact surface of the housing over which the puck slidably moves. In another aspect, the frictional forces in graph 30 represent friction between a positioning element (to which the puck is linked) and an interior component(s) of the housing against which the positioning element slidably moves. In other aspects, the frictional forces in graph 30 represent friction due to other mechanical interactions placing drag or friction upon movement of the puck and/or associated positioning element.

Within this friction range 40A, 40B, the position of the positioning element is indeterminate when the puck is released. In other words, the positioning element is often not properly re-centered at the zero-input position because the frictional forces acting against the positioning element are greater than the biasing force of the conventional re-centering mechanism intended to control re-centering of the positioning element.

Accordingly, a conventional re-centering mechanism as represented by first curve 36 allows positioning errors adjacent a zero-input position of the positioning element.

The second spring curve 39 represents a force curve for a re-centering mechanism including at least one spring element, according to an embodiment of the invention. Beginning at the zero-input position, the second spring curve 39 comprises a biasing force exceeding friction forces acting on the positioning element adjacent the zero-input position 33. Accordingly, movement of the positioning element to a non-zero input position and subsequent release of the positioning element, the biasing force of the re-centering mechanism is sufficient to overcome the friction force (represented by friction threshold 38) and insure that the positioning element is accurately re-centered to a true zero-input position 33. In one aspect, the second spring curve 39 illustrates that the biasing force of the re-centering mechanism remains substantially constant at all non-zero input positions of the positioning element, even as the positioning element is moved farther away from the zero-input position.

In another aspect, an alternate second spring 42 illustrates that the force of the re-centering mechanism can vary at non-zero input positions. In one aspect, the biasing force increases as the positioning element is moved farther away from the zero-input position. However, even with an increasing amount of force at non-zero positions, the starting force or minimum biasing force at the zero position is greater than the frictional forces.

Accordingly, force curve 39 illustrates that a re-centering mechanism, according to embodiments of the invention, exerts a consistent, relatively uniform biasing force on the positioning element in non-zero input positions and at the zero-input position, which contributes to precise and accurate capture of user control inputs associated with the positioning element. In addition, the user can be confident that upon release of the positioning element from a non-zero input position, the re-centering mechanism will return the positioning element to a zero-input position.

Figure 3:
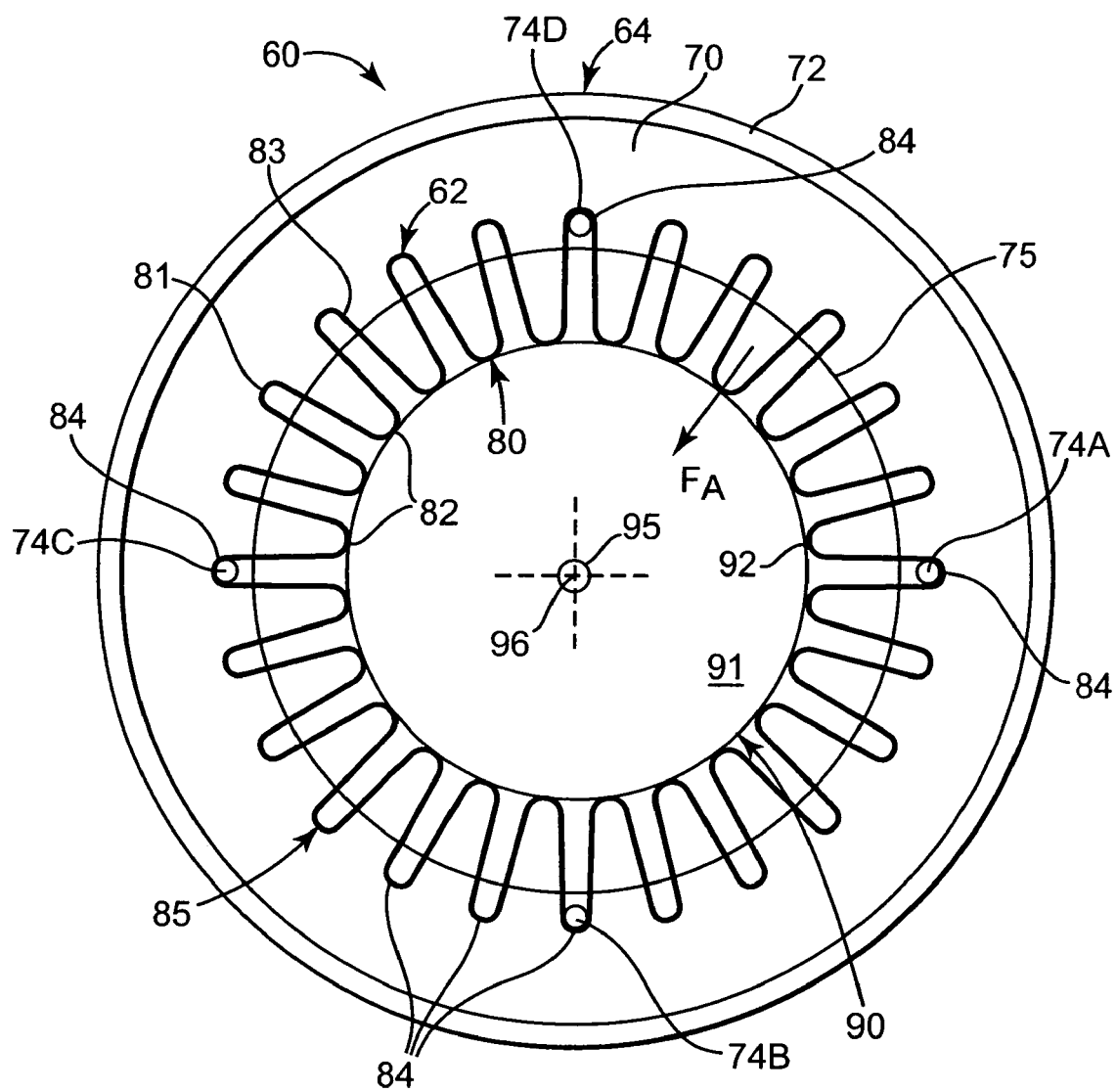
FIG. 3 is a top plan view of a re-centering mechanism of an input device in a first state, according to an embodiment of the invention.

FIG. 3 is a top plan view of a re-centering mechanism of an input device, according to one embodiment of the invention. As illustrated in FIG. 3, re-centering mechanism 60 comprises spring element 62 and frame 64 and is configured to re-center positioning element 90. In one aspect, frame 64 comprises body 70, rim 72, and a plurality of posts 74A, 74B, 74C, and 74D. Body 70 defines a generally annular shaped member defining an opening 75 and a rim 72 defining an outer periphery of the body 70. In one aspect, posts 74A-74D are disposed adjacent opening 75 of frame 64 in a generally circular pattern, generally corresponding to the shape of the opening 75. In one aspect, posts 74A-74D are spaced equidistant from each other at generally 90 degrees separation about a 360 degree circumference. In another aspect, posts 74A-74D are disposed elsewhere on body 70 of frame 64 and arranged in a generally non-circular pattern relative to each other.

Spring element 62 comprises inner portion 80 and outer portion 85. In one aspect, spring element 62 comprises a generally annular shaped spring. In another aspect, inner portion 80 defines a generally circular shape configured to generally correspond to a generally circular shape of a positioning element 90 disposed within inner portion 80 of spring element 62. In one aspect, positioning element 90 comprises a puck or movable disc. In another aspect, positioning element 90 comprises a member linked to a puck.

In one aspect, positioning element 90 extends upwardly from a larger disc element 160 (illustrated later in FIG. 6) that maintains positioning element 90 in proximity to opening 75 of frame 64.

In one aspect, spring element 62 and posts 74A-74D of re-centering mechanism 60 are positioned laterally outward relative to positioning element 90 and extend in generally the same plane as positioning element 90, thereby achieving a low profile for an input device containing positioning element 90 and re-centering mechanism.

In one embodiment, outer portion 85 of spring element 62 defines a generally circular shape and extends generally laterally, radially outward from inner portion 80 of spring element 62. In another aspect, outer portion 85 of spring element 62 comprises a non-circular shape. In one aspect, spring element 62 generally surrounds positioning element 90.

In one embodiment, as illustrated in FIG. 3, spring element 62 comprises a serpentine spring element. In one aspect, the spring element 62 comprises a single, unitary member. In one aspect, the generally serpentine shape of the spring element 62 defines an undulating pattern of a plurality of elongate folds 83. The elongate folds 83 of spring element 62 comprise a generally continuous series of inner loops 82 and outer loops 84 with a side wall 81 extending between and connecting each adjacent inner loop 82 and outer loop 84.

In one aspect, generally serpentine spring element 62 defines a generally planar element (extending through a single, generally horizontal plane) by having a thickness generally corresponding to (or less than) a thickness of the positioning element 90 so that with spring element 62 positioned to extend in generally the same plane as the positioning element 90, the spring member does not significantly extend vertically below or above the plane through which the positioning element 90 extends.

In another embodiment, in addition to be generally planar, the spring element 62 is a generally flat, sheet-like member formed via stamping as a single, unitary element to further reduce the thickness or profile of the re-centering mechanism. In this embodiment, the generally annular spring element 62 has a thickness generally equal to a thickness of the metal or material forming each sidewall of the respective folds of the spring element 62 so that the edges of the sidewalls extend in generally the same plane as the positioning element. In one aspect, the spring element 62 is formed by stamping via fine blanking or etching into a single, unitary element.

As illustrated in FIG. 3, spring element 62 is arranged in a first stretched state by positioning several outer loops 84 of spring element 62 about posts 74A-74D of frame 64 to releasably secure outer portion 85 of spring element 62 relative to frame 64. As illustrated later in FIG. 4, spring element 62 also comprises a relaxed state prior to its placement in the position illustrated in FIG. 3.

As illustrated in FIG. 3, posts 74A-74D of frame 64 act as a stop mechanism to prevent spring element 62 from moving radially inward to fully return to its relaxed state, thereby effectively creating a biasing force $F_A$ of spring element 62 acting radially inward toward positioning element 90 as spring element 62 attempts to return to its relaxed state. The amount of biasing force $F_A$ is determined by several parameters including the spacing of posts 74A-74D, the type and thickness of the material forming spring element 62, etc.

In one aspect, positioning element 90 is sized with a diameter generally corresponding to a diameter of inner portion 80 of spring element 62 in the first stretched state illustrated in FIG. 3 so that positioning element 90 remains in releasable contact against inner portion 80 of spring element 62 at the zero-input position. Accordingly, lateral movement of the positioning element 90 causes an immediately corresponding movement of at least a portion of spring element 62. This arrangement enables application of a biasing force FA upon any lateral slidable movement of positioning element 90 away from the zero-input position 33 (FIG. 2) to insure frictional forces are always counteracted by the biasing force exerted by the spring element 62.

Opening 75 in body 70 of frame 64 also has a diameter greater than a diameter of positioning element 90 to enable movement of positioning element 90 within the area of opening 75. In one aspect, positioning element 90 extends vertically upward relative to body 70 so that opening 75 prevents lateral movement of positioning element 90 beyond edge of opening 75.

In another aspect, spring element 62 has a width between inner portion 80 (defined by inner loops 82) and outer portion 85 (defined by outer loops 84) that is sized to generally match the maximum range of lateral displacement of spring element 62 from the first stretched state illustrated in FIG. 3 to a second stretched state illustrated later in FIG. 5. In one aspect, rim 72 defines an outer boundary limiting the extent to which spring element 62 is stretched radially outward.

In another aspect, positioning element 90 comprises a body 91, outer edge 92 and center 95. As illustrated in FIG. 3, the outer edge 92 is in releasable contact with the inner portion 80 of spring element 62 and center 95 of positioning element 90 is aligned with zero-input position 96 of positioning element 90 (which corresponds to zero-input position 33 in FIG. 2). This zero-input position 96 corresponds to an accurately centered positioning element 90 and also to a position to which the positioning element 90 (the puck) will return under a biasing force FA of spring element 62 after positioning element 90 is displaced from its starting, zero-input position.

Figure 4:
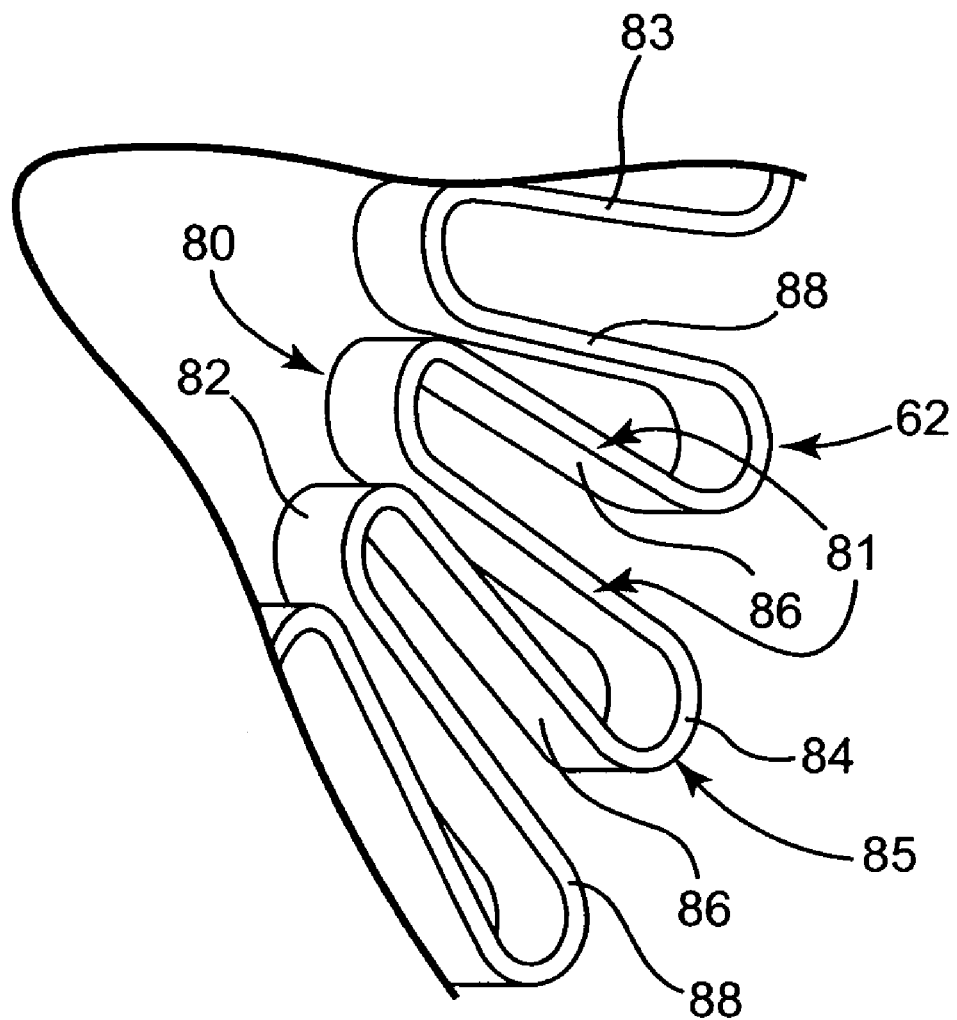
FIG. 4 is an enlarged partial isometric view of a spring element of the re-centering mechanism of FIG. 3, according to an embodiment of the invention.

FIG. 4 is partial fragmentary view of spring element 62, according to one embodiment of the invention. As illustrated in FIG. 4, spring element 62 comprises a plurality of folds 83 arranged in an undulating or serpentine pattern. Each side wall 81 of the respective folds 83 of spring element 62 comprise a body 86 and an edge 88 with body 86 of respective adjacent side walls 81 facing each other. In one aspect, FIG. 4 also illustrates spring element 62 in a relaxed state in which inner loops 82 are immediately side-by-side, touching each other or almost touching each other. In contrast, spring element 62 as illustrated in FIG. 3 illustrates spring element in a first stretched state in which inner loops 82 are laterally spaced apart from each other.

In one embodiment, as illustrated in FIG. 4, spring element 62 comprises a non-coil spring. In one embodiment, spring element 62 has a thickness no greater than a thickness of the positioning element 90 (FIG. 3).

Figure 5:
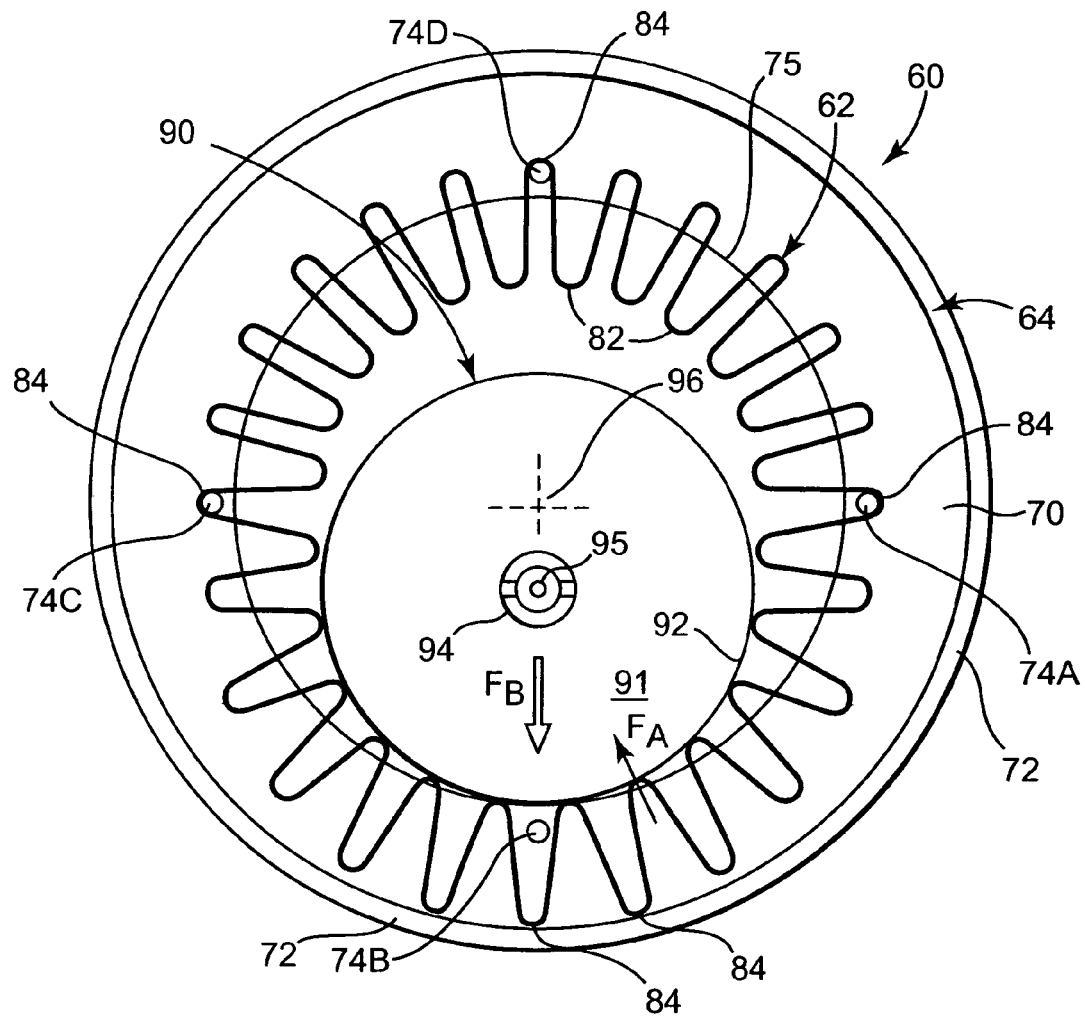
FIG. 5 is a top plan view of the re-centering mechanism of FIG. 3 in a second state, according to an embodiment of the invention.

In another aspect, the body 86 and edges 88 of spring element 62 of FIGS. 3-5 extend in a plane generally perpendicular to the plane through which positioning element 90 extends and slidably moves. Accordingly, while the spring element 62 as a whole extends generally parallel to and in generally the same plane as the positioning element 90, each respective individual folds 83 of spring element 62 is oriented to extend in a plane that is generally perpendicular relative to the plane through which positioning element 90 (FIGS. 3-7) extends and slidably moves. Accordingly, in this aspect, spring element 62 as illustrated in FIG. 4 comprises a generally planar member but does not comprise a generally flat, sheet-like member.

FIG. 5 is a top plan view of the re-centering mechanism 60 of FIG. 4, except illustrating movement of positioning element 90 to stretch spring element 62 laterally outward in a first direction into a second stretched state, according to one embodiment of the invention. This maneuver generally corresponds to a user moving positioning element 90 (or a linked puck) to capture a user control input of an input device, with FIG. 5 illustrating a response of re-centering mechanism 60 to this user-initiated movement of positioning element 90.

As illustrated in FIG. 5, in one embodiment, positioning element 90 further comprises an inner ring 94 defining hole 95. A finger-applied force $F_B$ is applied to positioning element 90 directly (or indirectly via a linkage to a puck) to move positioning element 90 in a first direction, as indicated by directional force arrow $F_B$. This finger-applied force $F_B$ is greater than the biasing force $F_A$ of the spring element 62.

In particular, as the positioning element 90 is moved laterally outward in a direction (indicated by directional force arrow $F_B$), outer edge 92 of positioning element 90 (in releasable contact with inner portion 80 of spring element 62) forces inner loops 82 of spring element 62 apart from each other while pushing outer loop 84 radially apart from post 74B of frame 64. As illustrated in FIG. 5, the remaining outer loops 84 of spring element 62 remain releasably secured about their corresponding posts 74A, 74C, 74D to anchor sides of spring element 62 while the other side of spring element 62 adjacent post 74B is being stretched laterally outwardly.

Upon release of finger-applied force $F_B$, biasing force $F_A$ exerted by spring element 62 returns spring element 62 to the center position 96 (or zero-input position) illustrated in FIG. 3, in which hole 95 of positioning element 90 matches the position of center position 96. In one aspect, the biasing force $F_A$ is greater than any frictional forces between components of input device to insure that positioning element 90 is returned to an accurate zero input position. In another aspect, the omnidirectionally distributed, radially inward biasing force $F_A$ exerted by spring element 62 further insures return of positioning element 90 to an accurate zero-input position.

In one aspect, the biasing force $F_A$ exerted by spring element 62 generally corresponds to the amplitude of force in the second force curve 39 in FIG. 2, which a force exceeding frictional forces (represented by friction threshold 38) adjacent the zero-input position 33 (FIG. 2) of positioning element 90.

In another aspect, positioning element 90 is slidably movable in any direction with 360 degree orientation relative to centered zero-input position 96. When moved in directions other than that illustrated in FIG. 5, spring element 62 is released from contact against more than one post (e.g., posts 74C and 74D) while retaining releasable contact against the remaining respective posts (e.g., posts 74A and 74B).

In another aspect, positioning element 90 need not be moved its full range of motion to contact edge of opening 75 of frame 64 (and with contact of outer portion 85 of spring element 62 against rim 72), as the desired user control input may be achieved by partial movement of positioning element 90.

Accordingly, re-centering mechanism 60 acts to accurately maintain a center position and/or accurately return a positioning element 90 to a center position.

Figure 6:
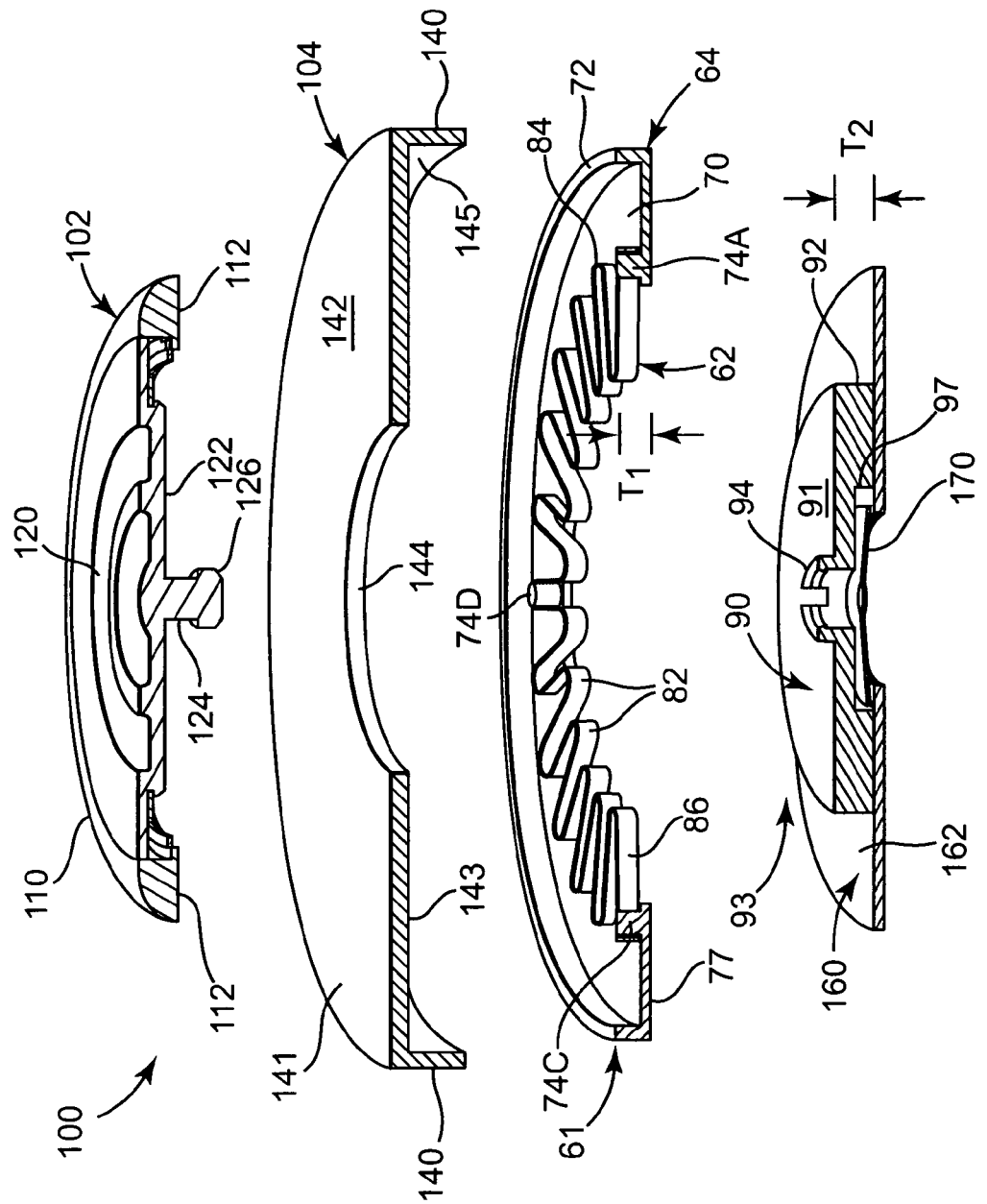
FIG. 6 is an exploded, assembly view of an input device, according to an embodiment of the invention.

FIG. 6 is an exploded assembly view of input device 100 in an unassembled state, according to one embodiment of the invention. As illustrated in FIG. 6, input device 100 comprises puck 102, housing 104, re-centering mechanism 61, and positioning mechanism 93. In one embodiment, re-centering mechanism 61 acts as a subassembly of input device 100 and comprises substantially the same attributes and features as re-centering mechanism 60 illustrated and described in association with FIGS. 3-5 and is identified with like reference numerals. In one embodiment, positioning mechanism 93 acts as a subassembly of input device 100 and comprises substantially the same attributes and features as positioning element 90 illustrated and described in association with FIGS. 3-5 and is identified with like reference numerals, except further including disc 160.

As illustrated in FIG. 6, puck 102 is a movable disc comprising outer ring 110 and inner disc 120. Outer ring 110 comprises a generally annular shaped ring including a generally flat bottom surface 112. Inner disc 120 is nested within outer ring 110 and comprises a bottom surface 122 recessed relative to bottom surface 112 of outer ring 110. Inner disc 120 of puck 102 also comprises stem 124 with head 126, which extends downwardly from and generally perpendicular to bottom surface 122 of inner disc 120. In one aspect, inner disc 120 comprises a flexible, resilient material.

As illustrated in FIG. 6, housing 104 comprises wall 140, body 141 defining an outer surface 142 and central opening 144. Body 141 defines a generally disc shaped member and with wall 140 defining recess 145. In one aspect, stem 124 has a length sized to extend through opening 144 of housing 104 for connection within central hole 94 in positioning element 90.

Figure 7:
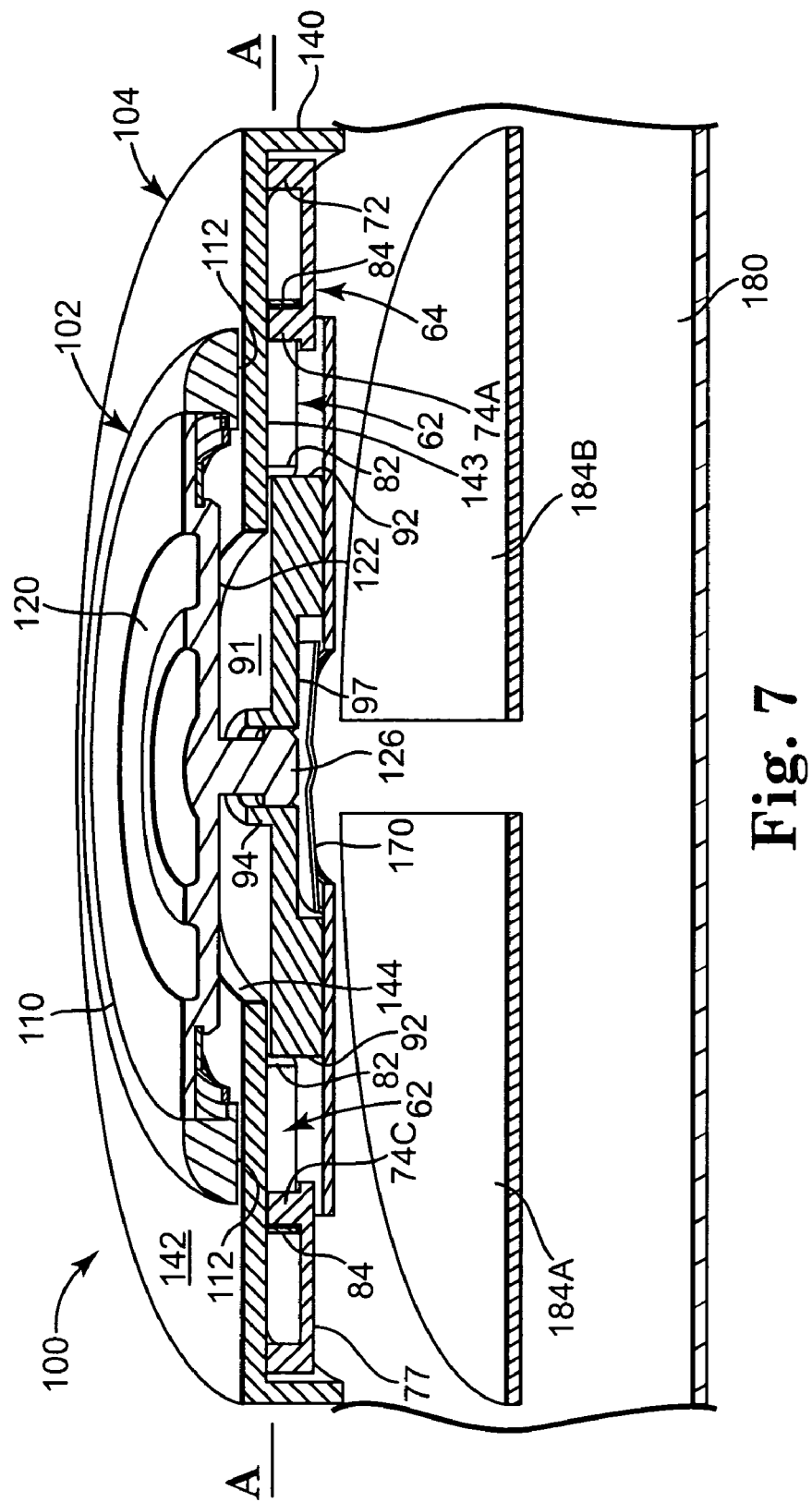
FIG. 7 is sectional view of the input device of FIG. 6 in an assembled state, according to an embodiment of the invention.

In one embodiment, as illustrated in FIG. 6 and when assembled as illustrated in FIG. 7, spring element 62 is sandwiched between housing 104 and frame 64 with the frame 64 and body 141 of housing 104 extending generally parallel to each other on opposite sides of spring element 62.

As illustrated in FIG. 6, positioning mechanism 93 comprises positioning element 90 and disc 160. Disc 160 is connected to a bottom of element 90 and has a diameter greater than a diameter of positioning element 90 so that disc 160 defines a surface 162 extending radially outward from an outer edge 92 of positioning element 90. In one aspect, a diameter of disc 160 exceeds a diameter of opening 75 to facilitate maintaining a relative position between positioning element 90 and opening 75 of frame 64.

In one aspect, positioning element 90 comprises a recess 97 shaped and sized to receive a dome switch 170. When assembled as illustrated in FIG. 7, upon pressing of dome switch 170 via pressure from puck 102 via stem 124, dome switch 170 enables capturing of at least one user control input such as activation of a function of input device 10.

In one embodiment, as illustrated in FIG. 6, spring element 62 has a thickness (T1) no greater than a thickness (T2) of positioning element 90. In one aspect, spring element 62 has a thickness (T1) substantially less than a thickness (T2) of positioning element 90.

In another embodiment, not illustrated in FIGS. 6-7, posts 74A-74D are disposed on surface 143 of housing 104 (e.g. in a generally circular pattern), instead of on body 70 of frame 62 (FIG. 3), to protrude downwardly from surface 143 to releasably engage outer portion 85 of spring element 62. In all other respects, posts 74A-74D comprise substantially the same features and attributes (e.g., acting as a stop mechanism to limit movement of spring element 62) as posts 74A-74D on frame 64 as previously described in association with FIGS. 3-7.

Additional features of input device 100 are described and illustrated in association with FIG. 7.

FIG. 7 is sectional view of input device 100 in an assembled state, according to one embodiment of the invention. As illustrated in FIG. 7, puck 102 rests on top of housing 104 with bottom surface 112 of puck 102 arranged in slidable contact against surface 142 of housing 104. Both re-centering mechanism 61 and positioning element 93 are nested together within outer wall 140 of housing 104. In one aspect, positioning element 90 is slidably movable relative to the inner surface 143 of housing 104 and spring element 62 is slidably movable relative to the inner surface 143 of housing 104.

In the nested position illustrated in FIG. 7, stem 124 (with head 126) of puck 102 extends through opening 144 of housing 104 to connect to positioning element 90 via central hole 94. This connection acts to generally maintain the vertical position of puck 102 relative to housing 104 and generally maintain the vertical position of positioning mechanism 93 and re-centering mechanism 61 relative to housing 104.

In one aspect, lateral movement of puck 102 via finger pressure in a laterally outward direction relative to housing 104 causes a directly corresponding movement of positioning element 90. Spring element 62 of re-centering mechanism 61 permits such movement, as illustrated in FIG. 5, but exerts a substantially continuous biasing force $F_A$ on positioning element 90 to cause positioning element 90 to return to a zero-input position 96 (FIG. 3-5) as soon as finger pressure is released from puck 102. FIG. 7 also illustrates spacing between bottom surface 122 of inner ring 120 of puck 102 and surface 91 of positioning element 90, and between bottom surface 122 of inner ring 120 of puck 102 and surface 142 of housing 104. This spacing enables inner ring 120 to move downward a small distance as puck 102 is pressed downward to activate switch 170.

In one embodiment, disc 160 is a conductive element and input device 100 is mountable to a printed circuit board 180 that comprises an integrated circuit including a plurality of electrodes (e.g., electrodes 184A, 184B) associated with disc 160 for capacitively sensing the position of disc 160 relative to the plurality of position electrodes (e.g., 184A, 184B). Additional position electrodes similar to electrodes 184A, 184B are not illustrated for illustrative clarity.

In one aspect, input device 100 generally corresponds to a single hub arrangement in which housing 104 of input device 100 effectively contains the components of input device 100 relative to printed circuit board 180 without a second hub between housing 104 and printed circuit board 180. This single hub arrangement further contributes a low profile or small form factor for input device 100 when incorporated into a portable electronic device.

In one aspect, as illustrated in FIG. 7, positioning element 90, spring element 62, and a stop mechanism (e.g., posts 74A-74D) extend in generally the same plane (generally represented by line A) as each other with spring element 62 and posts 74A-74D extending radially and laterally outward relative to positioning element 90.

Figure 8:
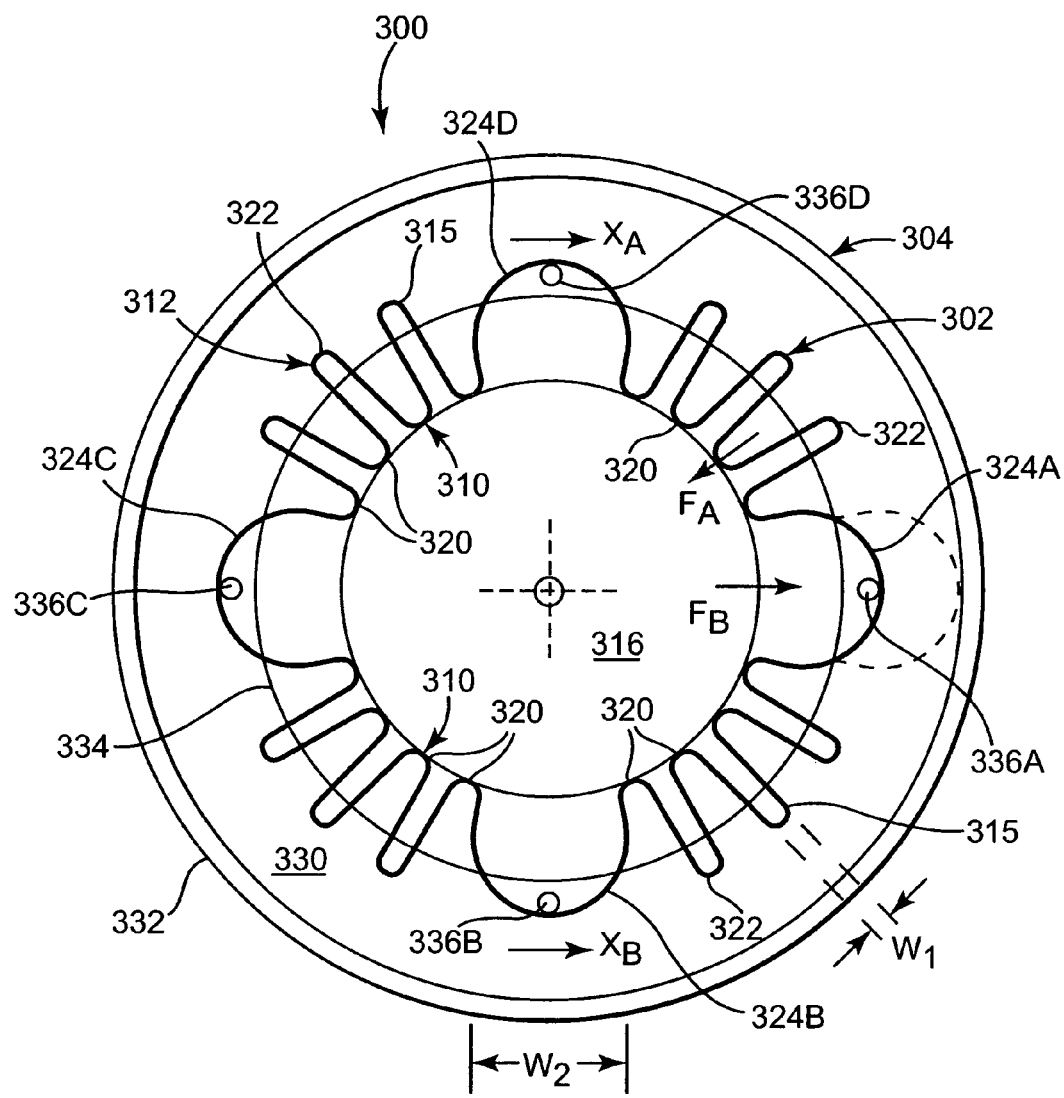
FIG. 8 is a top plan view of a re-centering mechanism of an input device, according to an embodiment of the invention.

FIG. 8 is a perspective view of a re-centering mechanism 300, according to one embodiment of the invention. In one embodiment, re-centering mechanism 300 comprises spring element 302 and frame 304. In one embodiment, spring element 302 and frame 304 comprises substantially the same features and attributes as spring element 62 and frame 64 of re-centering mechanism 60, as previously described in association with FIGS. 3-7 except for spring element 302 having a different shape than spring element 62. In one aspect, like spring element 62, spring element 302 comprises a generally planar member and in another aspect, spring element 302 comprises both a generally planar member and a generally flat, sheet-like member.

As illustrated in FIG. 8, spring element 302 comprises inner portion 310 and outer portion 312. Inner portion 310 defines a generally circular shape configured to generally correspond to a generally circular shape of a positioning element 316 disposed within inner portion 310. In one aspect, positioning element 316 comprises substantially the same features and attributes as positioning element 90 described in association with FIG. 3. Accordingly, in one aspect, inner portion 310 of spring element 302 generally surrounds positioning element 316.

In one aspect, outer portion 312 of spring element 302 defines a generally circular shape and extends generally laterally, radially outward from inner portion 310 of spring element 302 and in generally the same plane as inner portion 310. In one embodiment, spring element 312 comprises a serpentine spring element including a generally continuous unitary member defining an undulating pattern of a plurality of folds 315. The folds 315 of spring element 302 comprise a generally continuous series of inner loops 320 and outer loops 322 with a side wall 321 extending between adjacent pairs of respective inner loops 320 and outer loops 322.

In one aspect, spring element 302 comprises an array of generally circular shaped loops 324A-324D with each generally circular shaped loop interposed periodically between an adjacent pairs of elongate folds 315. In one aspect, the respective generally circular shaped loops 324A-324D are spaced apart about 90 degrees about a 360 degree circumference with the position of each respective loop 324A-324D corresponding to one of the respective posts 336A-336D. In one aspect, each respective generally circular shaped loop 324A-324D is sized and shaped to slide in a radially outward direction away from or tangentially relative to one of the respective posts (e.g., post 324A). In one example, when positioning element 316 is moved radially outward away from post 336A, then loop 324A moves radially outward from post 336A while two of the remaining respective generally circular shaped loops 324B and 324D slide tangentially relative to two of the respective posts (e.g., post 336B and 336D). This arrangement produces a more even distribution of stress throughout spring element 302 when spring element 302 is stretched in a particular direction.

In one aspect, spring element 302 has a greater or less number of generally circular loops (e.g., loop 324A-324D) than illustrated in FIG. 8.

In another aspect, as illustrated in FIG. 8, each fold 315 has a width (W1) and each loop 324A-324D has a width (W2) that is substantially greater than width W1 of the respective folds 315.

In one aspect, frame 304 comprises substantially the same features and attributes as frame 64 previously described in association with FIGS. 1-7. Accordingly, frame 304 comprises body 330, outer rim 332, and a plurality of posts 336A-336D. Body 330 defines a generally annular shaped member defining an opening 334 and outer rim 338 defining an outer periphery of the body 330. In one aspect, posts 336A-336D are disposed adjacent opening 334 of frame 304 in a generally circular pattern, generally corresponding to the shape of the opening 304. In one aspect, posts 336A-336D are spaced equidistant from each other at generally 90 degrees separation about a 360 degree circumference. In another aspect, posts 336A-336D are disposed elsewhere on body 330 of frame 304 and arranged in a generally non-circular pattern relative to each other.

As illustrated in FIG. 8, spring element 302 is arranged in a first stretched state by positioning anchoring loops 324A-324D of spring element 302 about respective posts 336A-336D of frame 304 to releasably secure spring element 302 relative to frame 304. In one aspect, spring element 302 also comprises a relaxed state prior to its placement in the position illustrated in FIG. 8, in a manner substantially similar to spring element 62 as illustrated in FIGS. 3-5.

As illustrated in FIG. 8, posts 336A-336D of frame 304 act as a stop mechanism against outer portion 312 of spring element 302 to prevent spring element 302 from returning to its relaxed state, thereby effectively creating a biasing force $F_A$ of spring element 302 acting radially inward toward positioning element 316 as spring element 302 attempts to return to its relaxed state. The amount of biasing force $F_A$ is determined by several parameters including the spacing of posts 336A-336D, the type and thickness of the material forming spring element 62, etc. In one aspect, posts 336A-336D extend in generally the same horizontal plane as spring element 302 and are directly in line with the biasing force of spring element 302.

In one embodiment, spring element 302 is a generally flat member having a vertical thickness generally equal to a thickness of the material forming spring element 302. In one aspect, the respective edges of each loop (e.g., loops 324A) and folds 315 of spring element 302 extend in the same generally horizontal plane and extend generally parallel to a generally horizontal plane through which positioning element 316 extends and slidably moves. In one aspect, this spring element 302 is formed via stamping (e.g., fine blanking) or etching a material into the form of spring element 302, thereby achieving the generally flat, sheet-like configuration of spring element 302 as a single unitary member.

In another aspect, spring element 302 is a generally planar member that is not generally flat.

In one aspect, spring element 302 has a thickness no greater than (i.e., generally equal or less than) a thickness of positioning element 316. In another aspect, spring element 302 has a thickness substantially less than a thickness of positioning element 316. This relatively small thickness of spring element 302 contributes to a low profile of re-centering mechanism, and therefore an overall low profile of an input device incorporating re-centering mechanism 300.

Figure 9:
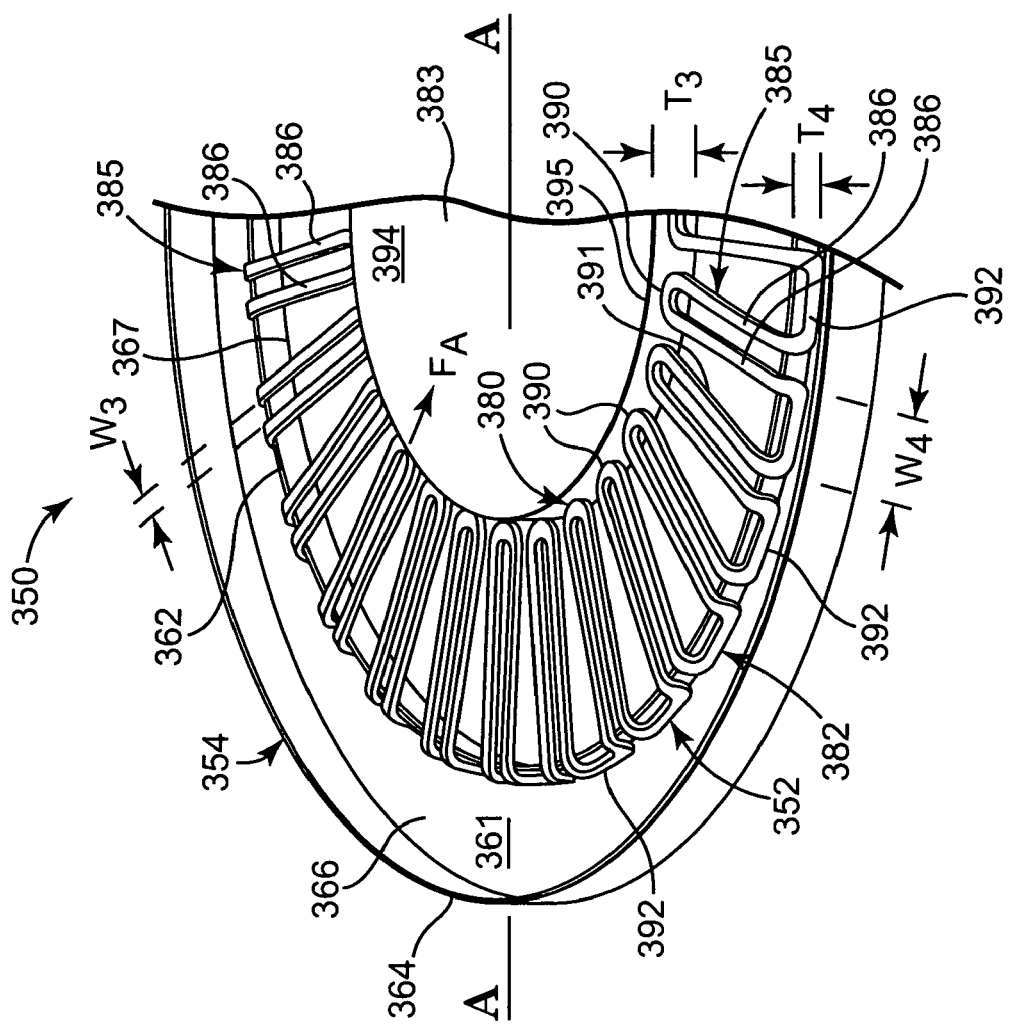
FIG. 9 is partial perspective view of a re-centering mechanism of an input device, according to an embodiment of the present invention.

FIG. 9 is a perspective view of a re-centering mechanism 350, according to one embodiment of the invention. In one embodiment, re-centering mechanism 350 comprises spring element 352 and frame 354 with re-centering mechanism 350 comprising substantially the same features and attributes as re-centering mechanism 60, as previously described in association with FIGS. 3-7 except for spring element 352 having a different shape. In one aspect, like spring element 62, spring element 352 comprises a generally planar member and in another aspect, spring element 352 comprises both a generally planar member and a generally flat, sheet-like member.

As illustrated in FIG. 9, frame 354 comprises body 360, inner rim 362, and outer rim 364. In one aspect, inner rim 362 and outer rim 364 together define a recess 366 in body 360. Body 360 defines a generally annular shaped member defining an opening 367. In one aspect, inner rim 362 defines a generally circular pattern, generally corresponding to the shape of the opening 367. In another aspect, inner rim 362 is disposed elsewhere on body 360 of frame 354 and arranged in a generally non-circular pattern.

Spring element 352 comprises inner portion 380 and outer portion 382. Inner portion 380 defines a generally circular shape configured to generally correspond to a generally circular shape of a positioning element 383 disposed within inner portion 380. In one aspect, this positioning element 383 comprises substantially the same features and attributes as positioning element 90 described in association with FIGS. 3-7. Accordingly, in one aspect, spring element 352 generally surrounds positioning element 383.

In one aspect, outer portion 382 of spring element 352 defines a generally circular shape and extends generally laterally, radially outward from inner portion 380 of spring element 352. In one embodiment, spring element 352 comprises a serpentine spring element including a generally continuous unitary member defining a generally continuous series (e.g., plurality) of folds 385 extending from each other in a generally side-by-side undulating pattern. Each fold 385 comprises a pair of arms 386 extending generally parallel to each other. The folds 385 of spring element 352 comprise an undulating pattern including inner loops 390 and outer loops 392 with arm (or body) 391 extending between adjacent inner loop 390 and outer loop 392.

In one aspect, spring element 352 has a thickness no greater than (i.e., generally equal or less than) a thickness of positioning element 383. In another aspect, spring element 352 has a thickness substantially less than a thickness (T3) of positioning element 383, as illustrated in FIG. 9.

In one aspect, inner loop 390 of spring element 352 is generally arcuate shaped to define a 180 degree curve. In another aspect, each outer loop 392 of spring element 352 is generally rectangular shaped with the plurality of outer loops 392 configured as a flange (e.g., a raised member) that extends generally perpendicular to a body 391 of the folds 385 of spring element 352 to releasably secure (or hook) outer portion 382 of spring element 352 relative to inner rim 362 of frame 354. Accordingly, inner rim 362 of frame 354, in combination with the inner rim defined by the outer loops 392 of spring element 352 acts a stop mechanism to prevent further radially inward movement of spring element 352 relative to positioning element 383 and to permit radially outward movement of spring element relative to inner rim 362 of frame 354.

In one aspect, inner loop 390 and body 391 of each fold 385 of spring element 352 extend in generally the same plane as positioning element 383 while the respective outer loops 392 (which define a flange) extend generally perpendicular to the plane through which positioning element 383 extends and slidably moves.

In another embodiment, not illustrated in FIG. 9, substantially all of spring element 352 extends generally in a single plane so that outer loops 392 extend generally parallel to and in generally the same plane as inner loops 390. In this embodiment, spring element 352 comprises a plurality of tabs defined on several outer loops 392 of spring element 352 for releasably engaging (e.g., hooking onto) inner rim 362 of frame 354. Each tab extends generally perpendicular to the plane through which spring element 352 generally extends, and the tabs are formed in a generally circular pattern about the outer portion of spring element 352 for engaging inner rim 362 of frame 354. In one aspect, the tabs have substantially the same shape as tabs 516 and/or tabs 566 illustrated and described in association with FIGS. 12A-12B and 13A-13B, respectively.

Accordingly, spring element 352 comprises at least one raised member, in the form of tabs raised from several outer loops 392 (such as tabs 516 in FIGS. 12A-12B) or in the form of a flange of outer loops 392 as illustrated in FIG. 9, for releasably engaging inner rim 362 of frame 352.

As illustrated in FIG. 9, spring element 352 is arranged in a first stretched state by positioning substantially all of the outer loops 392 of spring element 352 about inner rim 362 of frame 354 to releasably secure outer portion 382 of spring element 352 relative to frame 354. In one aspect, spring element 302 also comprises a relaxed state prior to its placement in the position illustrated in FIG. 8, in a manner substantially similar to spring element 62 as illustrated in FIGS. 3-5.

As illustrated in FIG. 9, inner rim 362 of frame 354 prevents spring element 352 from returning to its relaxed state, thereby effectively creating a biasing force $F_A$ of spring element 352 acting radially inward toward a positioning element 383 as spring element 352 attempts to return to its relaxed state. The amount of biasing force $F_A$ is determined by several parameters including the diameter of inner rim 362 of frame 354, as well as the type and thickness of the material forming spring element 352, etc.

In one aspect, a diameter of inner portion 380 of spring element 352 in the first stretched state (illustrated in FIG. 9) is sized to generally correspond to a diameter of a positioning element 383 so that positioning element 383 remains in releasable contact against spring element 352 at the zero-input position. Accordingly, lateral movement of the positioning element 383 causes an immediately corresponding movement of at least a portion of spring element 352. This arrangement enables application of a biasing force $F_A$ upon any lateral slidable movement of positioning element 383 away from the zero-input position 33 (FIG. 2) to insure frictional forces are always counteracted by the biasing force exerted by the spring element 352.

Opening 367 in body 360 of frame 354 also has a diameter greater than a diameter of positioning element 383 to enable movement of positioning element 383 within the area of opening 367.

In one aspect, outer rim 364 defines an outer boundary limiting the extent to which spring element 352 is stretched radially outward.

In another aspect, positioning element 383 comprises a body 394 and outer edge 395. As illustrated in FIG. 9, the outer edge 395 is in releasable contact with the inner portion 380 of spring element 352 to enable a center of positioning element 383 to be aligned with a zero-input position (which corresponds to zero-input position 33 in FIG. 2 and zero-input position 96 in FIG. 3). This zero-input position corresponds to an accurately centered positioning element 383 and also to a position to which the positioning element 383 (or the puck) will return under a biasing force $F_A$ of spring element 352 after positioning element 383 is displaced from its starting, zero-input position.

Figure 10:
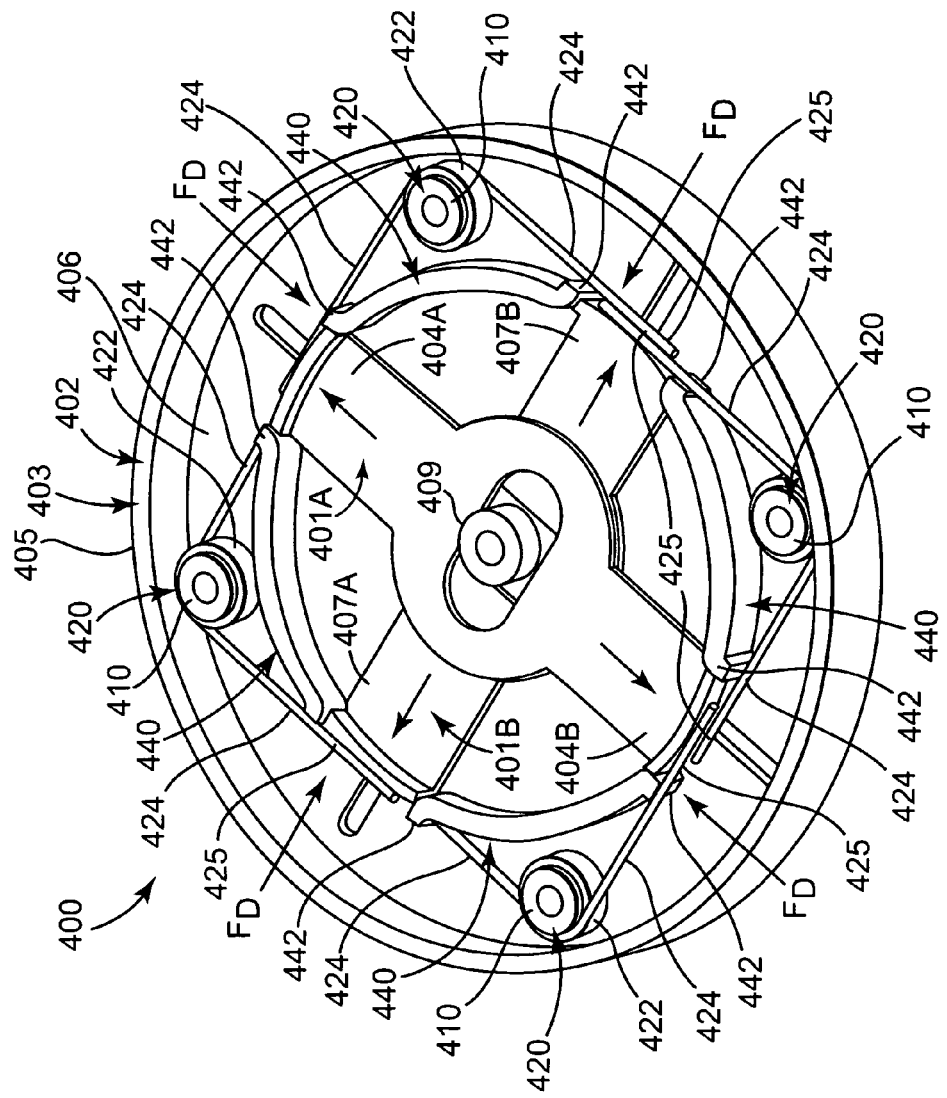
FIG. 10 is a perspective view of an input device, according to an embodiment of the invention.

FIG. 10 is a perspective view of an input device 400, according to one embodiment of the invention. As illustrated in FIG. 10, input device 400 comprises re-centering mechanism 402 and slider arms 401A, 401B. Lateral movement of each respective slider arm 401A, 401B separately or together cause movement of positioner 409, which is connectable to a puck such as puck 102 (FIG. 6-7). Accordingly, slider arms 401A, 401B act together to play a role substantially similar to positioning element 90 (FIGS. 2-7) except they define a two-part positioning mechanism instead of a single positioning element. Each slider arm 401A, 401B is arranged in slidable movement along a single axis, with the respective slider arms 401A, 401B arranged generally perpendicular to each other.

Re-centering mechanism 402 comprises shell 403 including rim 405, body 406, and anchors 410 extending generally upward from body 406. In one aspect, anchors 410 are arranged equidistant from each other in a generally square pattern and with each anchor 410 disposed adjacent rim 405 of shell 403. Re-centering mechanism 402 also comprises a plurality of spring mechanisms 420 with each respective spring mechanism 420 mounted on one of the respective anchors 410. Each spring mechanism 420 comprises a coil base 422 and a pair of arms 424 that extend radially outward from coil base 422. In the position illustrated in FIG. 10, each spring mechanism 420 is biased to move the respective arms 424 radially inward toward a central portion of shell 403. As illustrated in FIG. 10, each pair of arms 424 of a single spring mechanism 420 extends generally perpendicular to each other. In one aspect, each respective arm 424 has a length sized to enable an end 425 of each arm 424 to contact an end of each respective slider arm 401A, 401B. In another aspect, as illustrated in FIG. 10, each respective arm 424 has a length sized to enable the ends 425 of oppositely oriented, adjacent arms 424 to overlap each other adjacent each respective end (404A, 404B, 407A, 407B) of slider arms 401A, 401B.

In one embodiment, shell 403 also comprises inner walls 440 with each inner wall 440 including opposed ends 442. As illustrated in FIG. 10, each opposed end 442 of wall 440 acts as a stop mechanism to prevent further inward movement of each respective arm 424 of spring mechanism 420. However, each arm 424 remains in substantially continuous contact with an end 425 of each positioning elements 401A, 401B at an at-rest state. At least one arm 424 remains in contact with end of positioning element 404A, 404B upon positioning element being moved radially outward via finger pressure against biasing force FD exerted by arm 424 of spring mechanism 420.

When positioner 409 is moved diagonally (i.e., orthogonal to a longitudinal axis of either slider arm 401A, 401B), then both slider arm 401A and slider arm 401B slidably move along their axis. In one example, upon movement of positioner 409, both the end 404A of slider arm 401A and the end 407B of slider arm 401B move laterally outward against the ends 425 of respective adjacent arms 424 of respective spring mechanism(s) 420. Each spring mechanism 420 exerts the biasing force $F_B$ against the slider arms 401A, 401B to provide a controlled movement of slider arms 401A, 401B and cause re-centering of slider arms 401A and 401B as soon as finger-applied pressure is removed from slider arms 401A and 401B.

The biasing force $F_D$ provided by arms 424, as regulated by ends 442 of walls 440 (i.e., a stop mechanism), generally corresponds to the biasing force represented by second force curve 39 illustrated in FIG. 3. This biasing force profile enables accurate centering and re-centering of positioner 409 via slidable movement of slider arms 401A, 401B, thereby enabling accurate capturing of user control inputs via input device 400.

Figure 11:
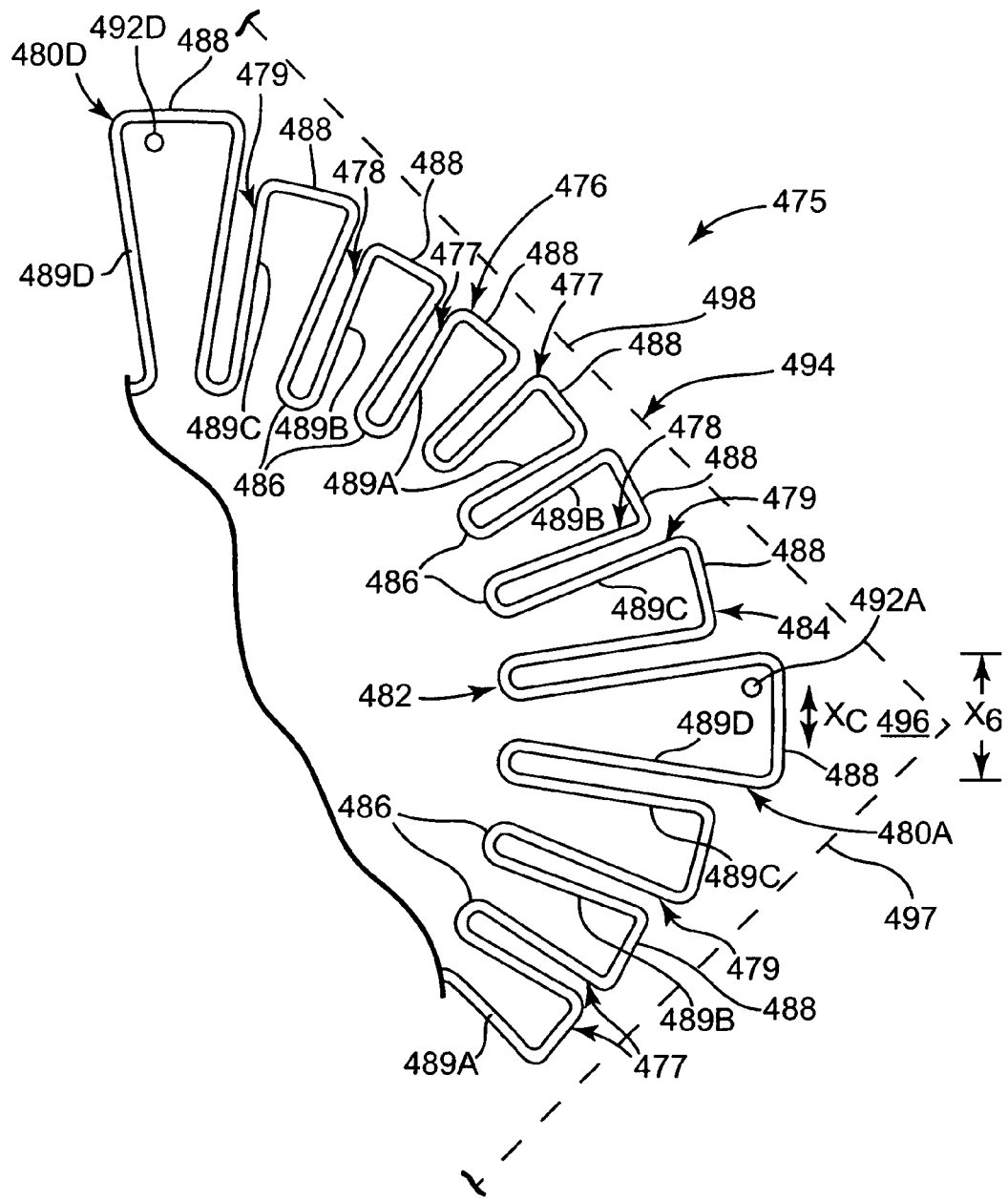
FIG. 11 is a partial top plan view of a spring member of a re-centering mechanism, according to an embodiment of the invention.

FIG. 11 is a partial top plan view of a re-centering mechanism 475 including spring member 476, according to an embodiment of the invention. In one embodiment, spring member 476 of re-centering mechanism 475 comprises substantially the same features and attributes as spring element 62 (previously described in association with FIGS. 3-7), except for having a differently sized and differently shaped folds 477, 478, 480A-480D of spring member 476. In addition, in one embodiment, re-centering mechanism 475 includes a generally rectangular shaped frame 494 including sidewalls 497, 498 and corner 496. In one aspect, frame 494 comprises substantially the same features and attributes as frame 64 of FIG. 3-7, except having a generally rectangular shape and differently placed posts of a frame of the re-centering mechanism. In another aspect, re-centering mechanism 475 is incorporated into an input device substantially the same as input device 100 of FIGS. 6-7, except with the components (e.g., housing 104) arranged to define a generally rectangular input device.

As illustrated in FIG. 11, in one embodiment, generally annular shaped spring member 476 comprises a generally continuous series or plurality of folds 477, 478, 480A-480D (loops 480 C, D not illustrated for illustrative clarity) arranged in an undulating or serpentine pattern. In one aspect, spring member 475 comprises an inner portion 482 defined by inner loops 486 of the respective folds (i.e., folds 477, 478, 479, and 480A-480D) and an outer portion 484 defined by the generally rectangular shaped outer loops 488 of the respective folds 477, 478, 479, and 480A-480D. In one aspect, spring member 476 comprises a generally planar member. In another aspect, in addition to being a generally planar member, spring member 476 defines a generally flat sheet-like member.

In one embodiment, each fold 477, 478, and 480A-480D includes an inner loop 486 and an outer loop 488 with sidewalls extending between the inner loop 486 and outer loop 488 of each respective fold. Accordingly, in one aspect, each respective fold 477 has side walls 489A while each respective fold 478 has side walls 489B. Each respective fold 479 has sidewalls 489C while each respective fold 480A-480D has side walls 489D. In one aspect, side walls 489D of folds 480A-480D have a length substantially greater than a length of side wall 489A of fold 477, sidewall 489B of fold 478, and sidewall 489C of fold 479. This arrangement enables placement of posts 392A into the corners 496 of the frame, with folds 480A, 480D having a longer length to reach the corner-placed posts 392A. In another aspect, folds 480A-480D of spring member 476 are spaced apart by about 90 degrees (relative to a 360 degree circumference in a manner similar to loops 324A-324D of FIG. 8) so that the position and orientation of folds 480A-480D generally correspond to the corners of the generally rectangular shape of frame 494.

Accordingly, a spring profile with select folds (480A-480D) having a substantially greater length enables placement of the spring into a generally rectangular frame to accommodate the layout of some portable electronic devices.

In addition, each respective side wall 489A-489D of folds 477-480D as arranged on spring member 476 has a different length than the other sidewalls 489A-489D so that folds 477, 478, 479, 480A-D vary in length (extending from inner portion 482 to outer portion 484) from shortest to longest. In one aspect, sidewall 489D is the longest and sidewall 489A the shortest, with sidewalls 478 and 479 having intermediate lengths. Accordingly, outer portion 484 of spring member 476 defines a peak-valley-peak profile along its periphery with the folds 477 defining a valley between respective peaks defined by folds 480A and 480D. In one aspect, this arrangement enables the valleys of spring member 476 as defined by the generally shortest folds 477 (as compared to folds 480A, 480D) to match up with the generally straight sides 497, 498 of the generally rectangular frame 494 at the same time that the longest folds 480A-480D extend into corners 496 of frame 494. In this manner, the outer portion 484 of spring member 476 is configured to generally correspond to the geometry of the generally rectangular shaped frame 494.

This arrangement of the varying the length of the respective folds 477-480D, and the inclusion of the relatively wide, generally rectangular outer loops 488 of each respective fold 477-480D enables increasing the overall length of spring member 476, which in turn lowers the overall stress on the spring member 476.

In one aspect, the generally elongate shape of each fold 477, 478, 479, and 480A-480D, and the generally rectangular shaped outer loops 488 of spring member 475 permit slidable movement of each outer loop 488 of a respective fold 480 in a direction radially outward similar to the direction represented by directional force arrow $F_B$ in FIG. 5 for spring element 62. In addition, in one aspect, the outer loop 488 of fold 480 has a width ($X_6$) substantially greater than a diameter of a post 492A (such as post 74A in FIG. 3). In another aspect, the width ($X_6$) of outer loop 488 generally corresponds to the diameter of the respective posts 492A.

Finally, in another embodiment, generally rectangular shaped frame 494 is replaced with a frame like frame 64 of FIGS. 3-7, i.e., having a generally annular shape with the long folds 480A-480D releasably secured about a post, such as post 72A of frame 64 in FIGS. 3-7.

Figures 12A, 12B, 13A, 13B:
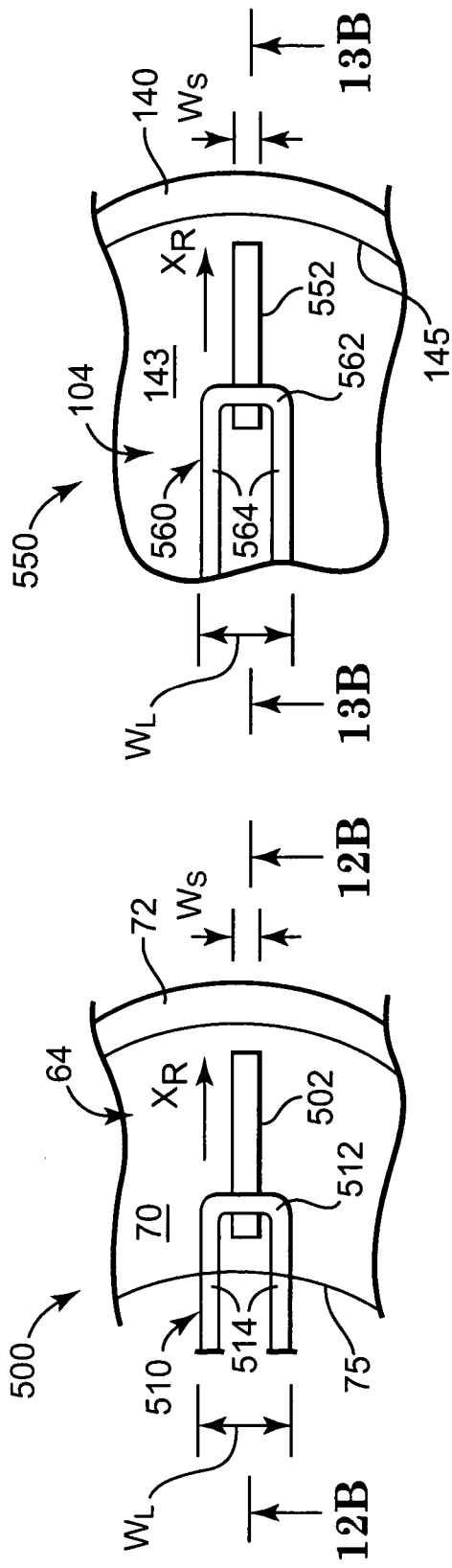
FIG. 12A is a top plan view of a re-centering mechanism, according to an embodiment of the invention.
FIG. 12B is a sectional view of the re-centering mechanism as taken along lines 12B-12B of FIG. 12A, according to an embodiment of the invention.
FIG. 13A is a partial bottom plan view of a re-centering mechanism, according to an embodiment of the invention.
FIG. 13B is a sectional view of the re-centering mechanism as taken along lines 13B-13B of FIG. 13A, according to an embodiment of the invention.

FIG. 12A is a partial top plan view of a portion of a re-centering mechanism 500, according to an embodiment of the invention. As illustrated in FIG. 12A, re-centering mechanism 500 comprises a frame 64 substantially the same as frame 64 as previously described in FIGS. 3-7 except replacing posts 74A-74D with corresponding slots 502 formed in body 70 of frame 64. In one aspect, each respective slot 502 is oriented in a direction (represented by directional arrow $X_R$) generally parallel to the radial outward movement of a respective fold 510 of a spring member (similar to spring element 62 in FIG. 3, spring member 302 of FIG. 8, or spring member 476 of FIG. 11, etc.). In one aspect, slot 502 is positioned between opening 75 and outer rim 72 of frame 64. In another aspect, re-centering mechanism 500 comprises a plurality of folds 510 of a spring member (like spring element 62) with each fold 510 including a pair of side walls 514 joined by end wall 512 at the outer portion of the spring member.

As illustrated in FIG. 12B, end wall 512 comprises a tab 516 protruding generally perpendicular to the plane through which body 70 of frame 64 extends, and through which the respective fold 510 of the spring member and positioning element (e.g. positioning element 90 in FIG. 3) slidably moves. Tab 516 is sized and shaped to be slidably received within slot 502 of frame 64, thereby enabling an outer portion of fold 510 of the spring member to be slidably moved radially inward and outward along slot 502. In one aspect, as illustrated in FIG. 12B, line Z illustrates a limit of the radially inward slidable movement of tab 516, and therefore a limit of the radially inward slidable movement of fold 510 of the outer portion of the spring member. Accordingly, tab 516 of fold 510 of a spring member and slot 502 of a frame 64 of a re-centering mechanism 500 together act as a stop mechanism to define a range of radially inward and outward movement of a spring member relative to a frame of a re-centering mechanism of a positioning element of an input device.

In one embodiment, slot 502 has a width WS that generally corresponds to a width of tab 516, as illustrated in FIG. 12A-12B. However, in another embodiment, slot 502 has a width WS that is substantially wider than a width of tab 516. Accordingly, in one aspect, slot 502 has a width WS generally corresponding to a width WL (or slighter wider than) of fold 510 so that tab 516 is movable transversely in slot 502 in addition to its movability in radially inward and radially outward directions (as represented by directional arrow $X_R$).

FIG. 13A is a partial bottom plan view of a portion of a re-centering mechanism 550, according to an embodiment of the invention. As illustrated in FIG. 13A, re-centering mechanism 550 comprises a housing 104 substantially the same as housing 104 as previously described in FIGS. 6-7 except replacing posts 74A-74D of frame 64 in FIGS. 6-7 with corresponding slots 552 formed in surface 143 of housing 104. In one aspect, each respective slot 552 is oriented in a direction (represented by directional arrow $X_R$) generally parallel to the radial outward movement of a respective fold 560 of a spring member (similar to spring element 62 in FIG. 3). In one aspect, slot 552 is located at a position radially inward relative to side wall 140 of housing 104. In another aspect, re-centering mechanism 550 comprises a plurality of folds 560 of a spring member (like spring element 62) with each fold 550 including a pair of side walls 564 joined by end wall 562 at the outer portion of the spring member. As illustrated in FIG. 13B, end wall 562 comprises a tab 566 protruding generally perpendicular to the plane through which surface 143 of housing 104 extends, and through which the respective fold 550 of the spring member and positioning element (e.g. positioning element 90 in FIG. 3) slidably moves. Tab 566 is sized and shaped to be slidably received within slot 552 of housing 104, thereby enabling an outer portion of fold 550 of the spring member to be slidably moved radially inward and outward along slot 552. In one aspect, as illustrated in FIG. 13B, line Z illustrates a limit of the radially inward slidable movement of tab 566, and therefore a limit of the radially inward slidable movement of fold 550 of the outer portion of the spring member. Accordingly, tab 566 of fold 560 of a spring member and slot 562 of a housing 104 of a re-centering mechanism 550 together act as a stop mechanism to define a range of radially inward and outward movement of a spring member relative to a frame of a re-centering mechanism of an input device.

In one embodiment, slot 552 has a width $W_S$ that generally corresponds to a width of tab 566, as illustrated in FIG. 13A-13B. However, in another embodiment, slot 552 has a width $W_S$ that is substantially wider than a width of tab 566. Accordingly, in one aspect, slot 552 has a width $W_S$ generally corresponding to a width $W_L$ (or slighter wider than) of fold 510 so that tab 516 is movable transversely in slot 552 in addition to its movability in radially inward and radially outward directions (as represented by directional arrow $X_R$).

Figure 14C:
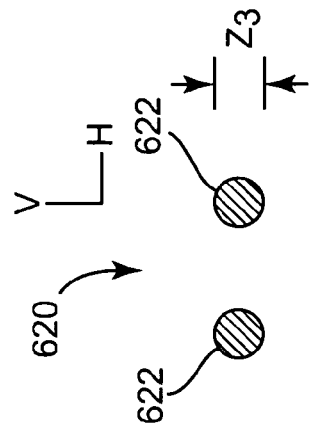
FIGS. 14A, 14B, 14C are sectional views of a spring member of a re-centering mechanism, according an embodiment of the invention.
Figure 14B:
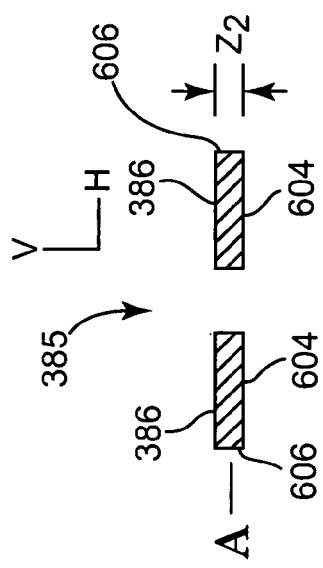
Figure 14A:
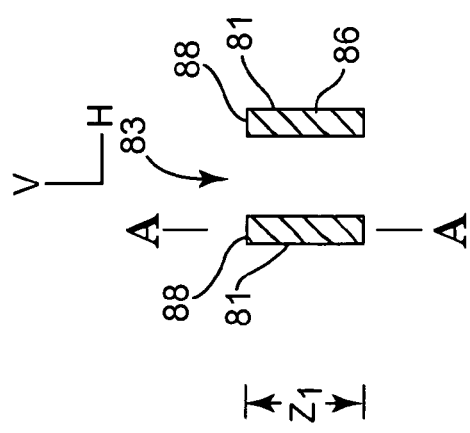

FIGS. 14A-14C are sectional views of various spring members, according to an embodiment of the invention. In one embodiment, as illustrated in FIG. 14A, one fold 83 of a plurality of folds 83 of spring member 62 of a re-centering mechanism comprises a pair of side walls 81 with each fold 83 comprising substantially the same features and attributes (e.g., side walls 81, edges 88, and faces 86) as previously described in association with FIGS. 3-7. In one aspect, when positioned adjacent a positioning element, a longitudinal axis (represented by line A) of the cross-sectional area of each side wall 81 extends in a generally vertical plane (represented by V in the directional indicator) and generally perpendicular to a generally horizontal plane (represented by H in the directional indicator). Each side wall 81 defines a generally rectangular cross-section and has height $Z_1$, that is generally equal to or less than a thickness of the positioning element (e.g., positioning element 90 in FIGS. 3-7). In one aspect, this generally vertical cross-sectional orientation of a spring member relative to generally horizontal plane (through which a positioning element extends) provides a relative lower amount of stress on the spring member.

In one embodiment, as illustrated in FIG. 14B, a fold 385 of a spring member 352 of a re-centering mechanism comprises substantially the same features and attributes (e.g. a pair of arms 386) as previously described in association with FIG. 9. In one aspect, when positioned adjacent a positioning element, a longitudinal axis (represented by line A) of the cross-sectional area of each arm 386 of fold 385 extends in a generally horizontal plane (represented by H in the directional indicator) and generally parallel to a generally horizontal plane (represented by H in the directional indicator). Each arm 386 has a generally rectangular cross-section and has a thickness or height $Z_2$ that is generally equal to or less than a thickness of the positioning element (e.g., positioning element 383 in FIG. 9). In one aspect, each arm 386 comprises face 604 and edges 606. In one aspect, thickness $Z_2$ of arm 386 of fold 385 in FIG. 14B is substantially less than thickness $Z_1$, of side wall 81 of each fold 83 in FIG. 14A. In another aspect, this generally horizontal cross-sectional orientation of a spring member, as illustrated in FIG. 14B, relative to a generally horizontal plane (through which a positioning element extends) provides somewhat more stress on the spring member, but achieves a lower profile input device because the spring member has a smaller thickness relative to the spring member of FIG. 14A (that has a generally vertical cross-sectional orientation). In one aspect, this embodiment generally corresponds to a generally flat, sheet-like spring member.

In another embodiment, as illustrated in FIG. 14C, a fold of a generally annular, generally planar spring member of a re-centering mechanism comprises substantially the same features and as those spring members previously described in association with FIGS. 1-14B, except that the arms 622 of each fold 620 of this spring member have a generally circular cross-sectional area. In one aspect, when positioned adjacent a positioning element, each arm 622 of each respective fold 620 of the spring member extends in generally the same plane, and generally parallel to a generally horizontal plane (represented by indicator H) through which a positioning element (e.g., positioning element 90 in FIG. 3) extends.

Embodiments of the invention provide an enhanced mobile computing experience by providing an input device configured to accurately re-center a positioning element. A biasing force of a re-centering mechanism is applied with sufficient amplitude to overcome frictional forces affecting the positioning element to insure that the positioning element is affirmatively returned to the proper starting position within its field of motion. A spring member and/or a stop mechanism of the re-centering mechanism are positioned in generally the same plane as the positioning element and are sized, respectively, to achieve a low profile to produce an input device having a small form factor suitable for portable electronic devices.

Although specific embodiments have been illustrated and described herein, it will be appreciated by those of ordinary skill in the art that a variety of alternate and/or equivalent implementations may be substituted for the specific embodiments illustrated and described without departing from the scope of the present invention. This application is intended to cover any adaptations or variations of the specific embodiments discussed herein. Therefore, it is intended that this invention be limited only by the claims and the equivalents thereof.

What is claimed is:

1. An input device for capturing user control inputs for an electronic device, the input device comprising:
   a positioning element comprising a substantially disc shaped member;
   a substantially annular shaped spring member, the spring member being a non-coil spring, the spring member being substantially planar on a plane and defining a substantially serpentine pattern on the plane, the spring member positioned laterally outward relative to the positioning element to substantially surround the positioning element and configured to exert a biasing force radially inwardly toward the positioning element;
   a movable puck; and
   a housing including a contact surface defining a puck field of motion and supporting slidable motion of the puck, the contact surface including an opening and the housing at least partially containing the positioning element and the spring member, wherein the positioning element is connected to the puck via the opening of the contact surface of the housing,
   wherein the spring member extends in substantially the same plane as the positioning element, and the input device farther comprises:
   a stop mechanism extending in substantially the same plane as the positioning element and as the spring member, the stop mechanism positioned laterally outward from the positioning element and configured to releasably engage the spring member to limit radial inward movement of the spring member against the positioning element.

2. The input device of claim 1 wherein the spring member comprises an inner portion and an outer portion, the inner portion and the outer portion extending in substantially the same plane as each other and the outer portion being spaced laterally outward from the inner portion, wherein the inner portion is configured for releasable contact against the positioning element and wherein the outer portion is configured for releasable contact against the stop mechanism to permit radially outward movement of the spring member relative to the stop mechanism and to prevent radially inward movement of the spring member relative to the stop mechanism.

3. The input device of claim 2 wherein the serpentine pattern of the spring member defines a substantially continuous series of elongate folds arranged in a substantially undulating pattern.

4. The input device of claim 3 wherein stop mechanism comprises a substantially annular shaped frame including a plurality of posts arranged in a substantially circular pattern, the plurality of posts substantially surrounding the positioning element and spaced laterally outward from the positioning element wherein at least one respective fold adjacent the outer portion of the spring member releasably engages one of the respective posts.

5. The input device of claim 4 wherein the spring member comprises an array of substantially circular shaped outer loops with each substantially circular shaped outer loop interposed between an adjacent pair of the elongate folds, wherein each respective substantially circular shaped outer loop corresponds to one of the respective posts, wherein each respective substantially circular shaped loop is sized and shaped to slide in at least one of:
  a radially outward direction away from the respective posts; and a lateral direction relative to the respective posts.

6. The input device of claim 3 wherein the outer portion of the spring member comprises at least one tab protruding substantially perpendicular to the plane through which the spring member and the positioning element substantially extend.

7. The input device of claim 3 wherein the stop mechanism comprises at least one slot oriented in a direction substantially parallel to the radial outward movement of the spring member and the at least one tab of the spring member is slidably received within the slot, wherein the at least one slot is formed in at least one of:
  the housing; and
  a substantially annular frame disposed on a side opposite the housing relative to the spring member.

8. The input device of claim 3 wherein the respective folds of the spring member comprise:
  a first plurality of folds having a first length; and
  a second plurality of folds having a second length, the second length substantially greater than the first length, wherein at least one respective fold of the second plurality of folds is interposed between at least one pair of the respective folds of the first plurality of folds to cause the outer portion of the spring member adjacent the at least one respective fold of the second plurality of folds to have a greater diameter than the outer portion of the spring member adjacent the respective folds of the first plurality of folds.

9. The input device of claim 8 wherein the stop mechanism comprises a substantially rectangular shaped frame including a plurality of posts, each respective post arranged adjacent each corner of the frame, the plurality of posts substantially surrounding the positioning element and spaced laterally outward from the positioning element, wherein each respective post of the frame supports releasable engagement of the at least one respective fold of the second plurality of folds about the respective posts.

10. The input device of claim 3 wherein the spring member comprises a substantially flat, sheet-like member.

11. The input device of claim 10 wherein the spring member has a thickness no greater than a thickness of the positioning element.

12. The input device of claim 10 wherein the outer portion of the spring member comprises at least raised member on a plurality of outer loops of the respective folds with the at least raised member of the respective outer loops extending substantially perpendicular to a body of each respective fold of the spring member.

13. The input device of claim 12 wherein the stop mechanism comprises a substantially annular shaped frame defining an opening via an inner rim and wherein the inner rim is configured to releasably receive the at least one raised member of the spring member to prevent further radially inward movement of the spring member and to permit radially outward movement of the spring member relative to inner rim of the frame of the stop mechanism.

14. The input device of claim 3 wherein a cross-sectional area of the respective folds of the spring member comprise at least one of a substantially vertically oriented rectangular cross-section, a substantially horizontally oriented rectangular cross-section, and a substantially circular cross-section.

15. A method of re-centering a puck for an input device of an electronic device, the method comprising:
  slidably moving a puck over a contact surface of a housing;
  constraining lateral movement of the puck via a positioning element within the housing, the positioning element connected to the puck via an opening in the contact surface of the housing;
  exerting substantially continuously, via a spring member, a biasing force radially inward toward the positioning element, the spring member being a substantially planar element and extending in substantially the same plane as the positioning element, the biasing force acting against the positioning element upon slidable movement of the positioning element relative to the spring member; and
  limiting, via a stop mechanism, movement of the spring member radially inward against the positioning element, the stop mechanism positioned laterally outward from the positioning element and extending in substantially the same plane as the positioning element and the spring member.

16. The method of claim 15 wherein exerting substantially continuously a biasing force radially inward comprises:
  arranging the spring member with an inner portion and an outer portion, the inner portion in releasable contact against the positioning element and the outer portion extending radially outward relative to the inner portion, the spring member having a thickness no greater than the thickness of the positioning element.

17. The method of claim 16 wherein limiting movement of the spring member comprises:
  arranging a substantially annular shaped frame to support slidable movement of the spring member relative to a body of the frame; and
  arranging the stop mechanism as at least one raised member extending in a substantially circular pattern on the body of the frame to engage the outer portion of the spring element to limit radially inward movement of the spring element and to permit radially outward movement of the spring element relative to the at least one raised member.

18. The method of claim 17 wherein the at least one raised member comprises at least one of:
  a plurality of posts, wherein the outer portion of the spring member comprises a plurality of loops sized and shaped so that each respective loop extends about one of the respective posts of the frame; and
  an inner rim extending substantially about an inner opening of the frame, wherein the spring comprises a body extending between the inner portion and the outer portion of the spring member, the outer portion comprising a flange extending substantially perpendicular to the inner portion and the body of the spring member.

19. The method of claim 15 wherein exerting a biasing force comprises:
  providing a substantially disc shaped frame and the positioning element comprising at least one slider arm slidably movable along the frame;
  arranging the at least one spring element as at least one torsion spring anchored to the frame to orient an arm of the torsion spring to extend substantially perpendicular to the slider arm and in releasable contact against an end of the at least one slider arm;

wherein limiting radially inward movement of the at least one spring member comprises:

arranging a stop member on the frame to enable releasable contact of the arm of the torsion spring against the stop member adjacent to the end of the slider arm, the stop member configured to permit radially outward movement of the arm of the torsion spring and of the finger of the resilient arm in response to laterally outward slidable movement of the slider arm.

20. An input device for a portable electronic device comprising:

a movable disc;

a housing frame configured to support slidable motion of the movable disc; and a re-centering mechanism exerting a non-zero biasing force toward the movable disc in substantially the same plane through which the movable disc slidably moves, the non-zero biasing force being exerted substantially continuously and radially inward toward the movable disc and acting on the movable disc upon slidable movement of the movable disc relative to the re-centering mechanism, wherein the non-zero biasing force exceeds a frictional force between the movable disc and the contact surface of the housing frame, wherein the re-centering mechanism comprises:

at least one spring element slidably movable relative to the housing frame and including an inner portion in releasable contact with the movable disc and a outer portion spaced laterally outward from the inner portion, the at least one spring element extending in substantially the same plane as the movable disc; and a limiting mechanism positioned laterally outward from the movable disc and extending in substantially the same plane as the movable disc, the limiting mechanism being substantially positioned laterally outward from the inner portion of at least one spring element and positioned to permit releasable contact of the outer portion of the at least one spring element.

21. The input device of claim 20 wherein the at least one spring element comprises a substantially annular shaped resilient member having a thickness no greater than a thickness of the positioning element and defining a series of elongate folds extending about a circumference of the resilient member.

22. The input device of claim 21 wherein the limiting mechanism comprises a frame for at least partially supporting the at least one spring element, the limiting mechanism including at least one raised member arranged substantially concentrically about and spaced from the movable disc for releasably engaging the outer portion of the at least one spring element, thereby permitting radially outward movement of the spring element and preventing radially inward movement of the spring element.

23. The input device of claim 20 and further comprising:

a housing including a contact surface and an opening; and a puck slidably supported on a contact surface of the housing and connected to the movable disc via the opening in the housing, the puck linked to the movable disc to cause a direct one-to-one correspondence between the lateral movement of the puck and the movable disc.

* * * * *